US012602655B2

(12) United States Patent (10) Patent No.: US 12,602,655 B2
Obata (45) Date of Patent: Apr. 14, 2026

(54) PRODUCTION MANAGEMENT SYSTEM, NON-TRANSITORY RECORDING MEDIUM, AND PRODUCTION MANAGEMENT METHOD

(71) Applicant: Yuzo Obata, Tokyo (JP)

(72) Inventor: Yuzo Obata, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 85 days.

(21) Appl. No.: 18/621,134

(22) Filed: Mar. 29, 2024

(65) Prior Publication Data

US 2024/0330853 A1 Oct. 3, 2024

(30) Foreign Application Priority Data

Mar. 31, 2023 (JP) ................................. 2023-059540
Mar. 11, 2024 (JP) ................................. 2024-037553

(51) Int. Cl.
 G06Q 10/087 (2023.01)
 G06Q 10/083 (2024.01)
 G06Q 30/0601 (2023.01)
 G06Q 50/04 (2012.01)
(52) U.S. Cl.
 CPC ......... G06Q 10/087 (2013.01); G06Q 10/083 (2013.01); G06Q 30/0623 (2013.01); G06Q 50/04 (2013.01)
(58) Field of Classification Search
 CPC ............... G06Q 10/087; G06Q 10/083; G06Q 30/0623; G06Q 50/04; G06Q 10/06
 See application file for complete search history.

(56) References Cited

U.S. PATENT DOCUMENTS

| | | | |
|---|---|---|---|
| 8,126,754 B1 * | 2/2012 | Nakasu .............. | G06Q 10/0631 |
| | | | 705/7.12 |
| 2013/0246283 A1 * | 9/2013 | Sugimoto ............ | G06Q 10/101 |
| | | | 705/300 |
| 2022/0156854 A1 | 5/2022 | Ishida | |
| 2022/0236934 A1 | 7/2022 | Matsushima | |
| 2022/0300218 A1 * | 9/2022 | Matsushima ...... | G06Q 30/0207 |

FOREIGN PATENT DOCUMENTS

| | | | |
|---|---|---|---|
| JP | 2002-150033 A | 5/2002 | |
| JP | 2003-091655 A | 3/2003 | |
| JP | 2013-196249 A | 9/2013 | |
| KR | 10-2269616 B1 | 6/2021 | |

OTHER PUBLICATIONS

Extended European Search Report issued Apr. 25, 2024 in European Patent Application No. 24167081.9, 7 pages.

* cited by examiner

*Primary Examiner* — Garcia Ade
(74) *Attorney, Agent, or Firm* — XSENSUS LLP

(57) ABSTRACT

A production management system includes circuitry to store in a memory profile information on a plurality of production companies, each production company owning at least one production site having production equipment connected to a network, display the profile information of the plurality of production companies to be viewed by a user of the production equipment, and receive selection of one of the plurality of production companies with which an order of a product to be produced is placed.

20 Claims, 15 Drawing Sheets

Figure 2:
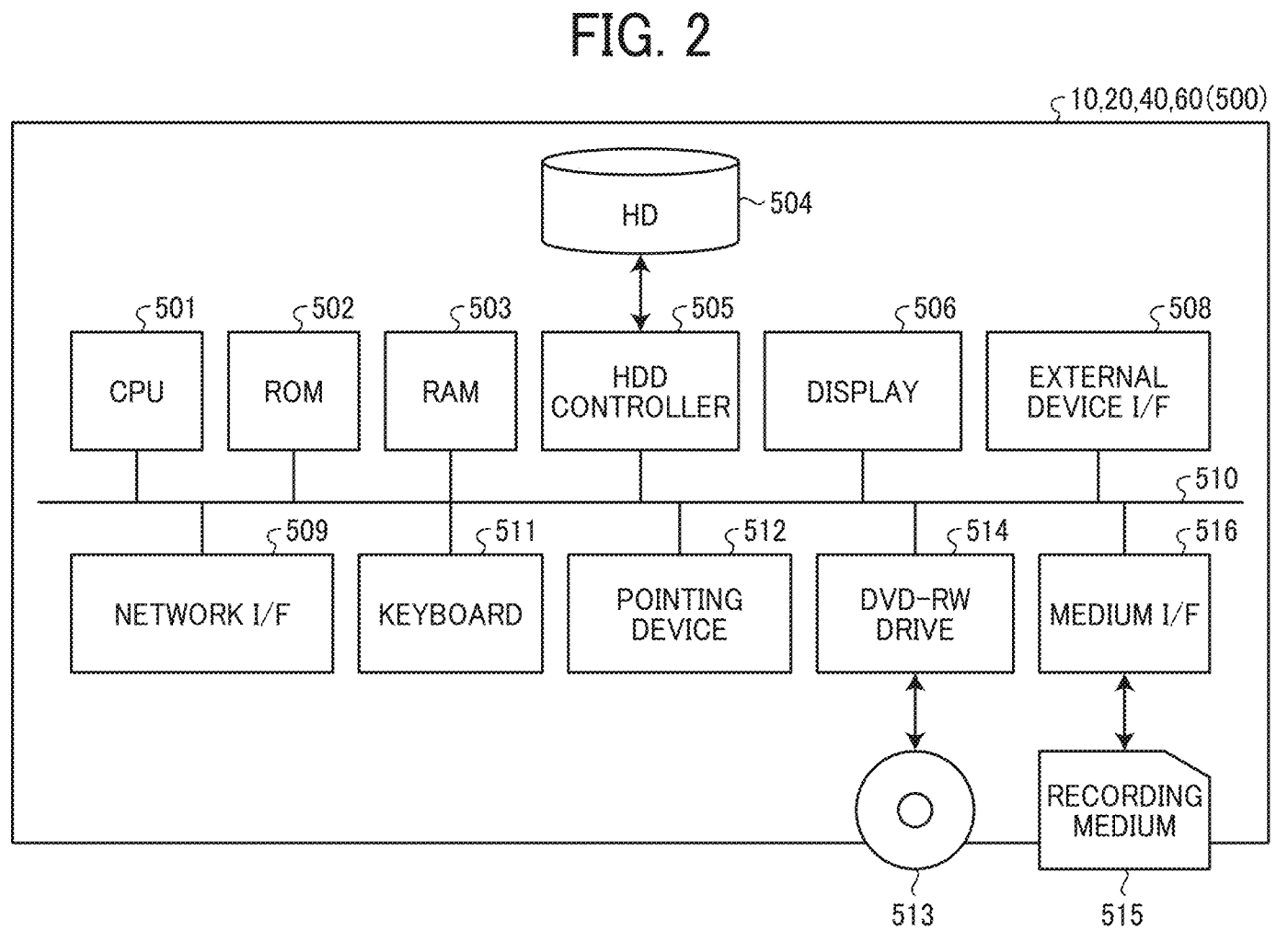

| 501 | 502 | 503 | | 504 |
| CPU | ROM | RAM | | HD |
| | | | 505 | |
| | | | HDD CONTROLLER | |
| | | | 506 | |
| | | | DISPLAY | |
| | | | 508 | |
| | | | EXTERNAL DEVICE I/F | |

509 NETWORK I/F

511 KEYBOARD

512 POINTING DEVICE

514 DVD-RW DRIVE

513

510

516 MEDIUM I/F

515 RECORDING MEDIUM

| Item | Example |
|---|---|
| Order ID | 12345678 |
| Job ID | 1 |
| Order Date & Time | 20XX/3/3 15:15 |
| Purchaser ID | ABC123 |
| Delivery Destination | Zip Code: XXX Tokyo······ |
| Stock Keeping Unit | T-shirt, Black, M |
| Print Image | Image001 M.jpg |
| Print Position | Front |
| ⋮ | ⋮ |
| Finished Product Image | 12345678-1.jpg |

FIG. 6

| Item | Contents |
|---|---|
| Product Company ID | PJ0001 |
| Profile Information 1 | Location (Production Site) |
| Profile Information 2 | Owned Production Equipment |
| Profile Information 3 | Specialty Products (Introduction) |
| Profile Information 4 | Orderable Products (Introduction) |
| Profile Information 5 | Production Capacity (per day, per week) |
| Profile Information 6 | Vision and Strengths on Business (Introduction) |
| Profile Information 7 | SDGs Activities |
| Profile Information 8 | Profile of Production Company (Self-introduction) |

FIG. 7

| Item | Contents |
|---|---|
| Equipment ID | KK0001 |
| Network Information | IP Address, MAC Address |
| Output Medium | Garment |
| Application | T-shirt |
| Equipment Operating State 1 | Total Production Volume |
| Equipment Operating State 2 | Equipment Maintenance History (Including repair history) |
| Equipment Operating State 3 | Equipment Operating Frequency |

1. Selection of Service a

Figure 8A:
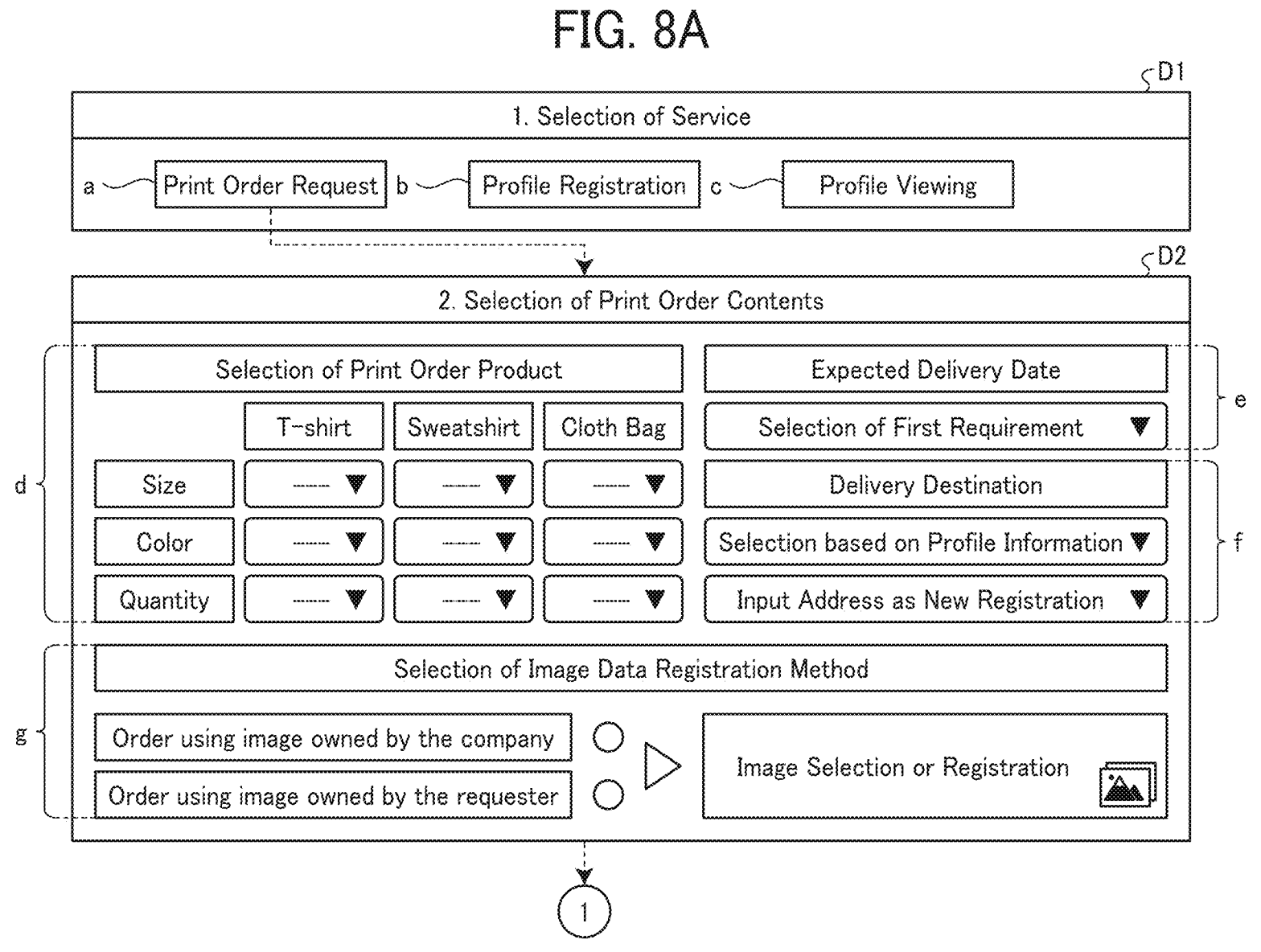

Print Order Request  b

Profile Registration  c  →  Profile Viewing

D2

2. Selection of Print Order Contents

Selection of Print Order Product

| | T-shirt | Sweatshirt | Cloth Bag |
|---|---|---|---|
| Size | ► | ► | ► |
| Color | ► | ► | ► |
| Quantity | ► | ► | ► | d

Expected Delivery Date

Selection of First Requirement  ► e

Delivery Destination

Selection based on Profile Information  ►

Input Address as New Registration  ► f

Selection of Image Data Registration Method

Order using image owned by the company  ○  △

Order using image owned by the requester  ○

Image Selection or Registration  ▲ g

Figure 8B:
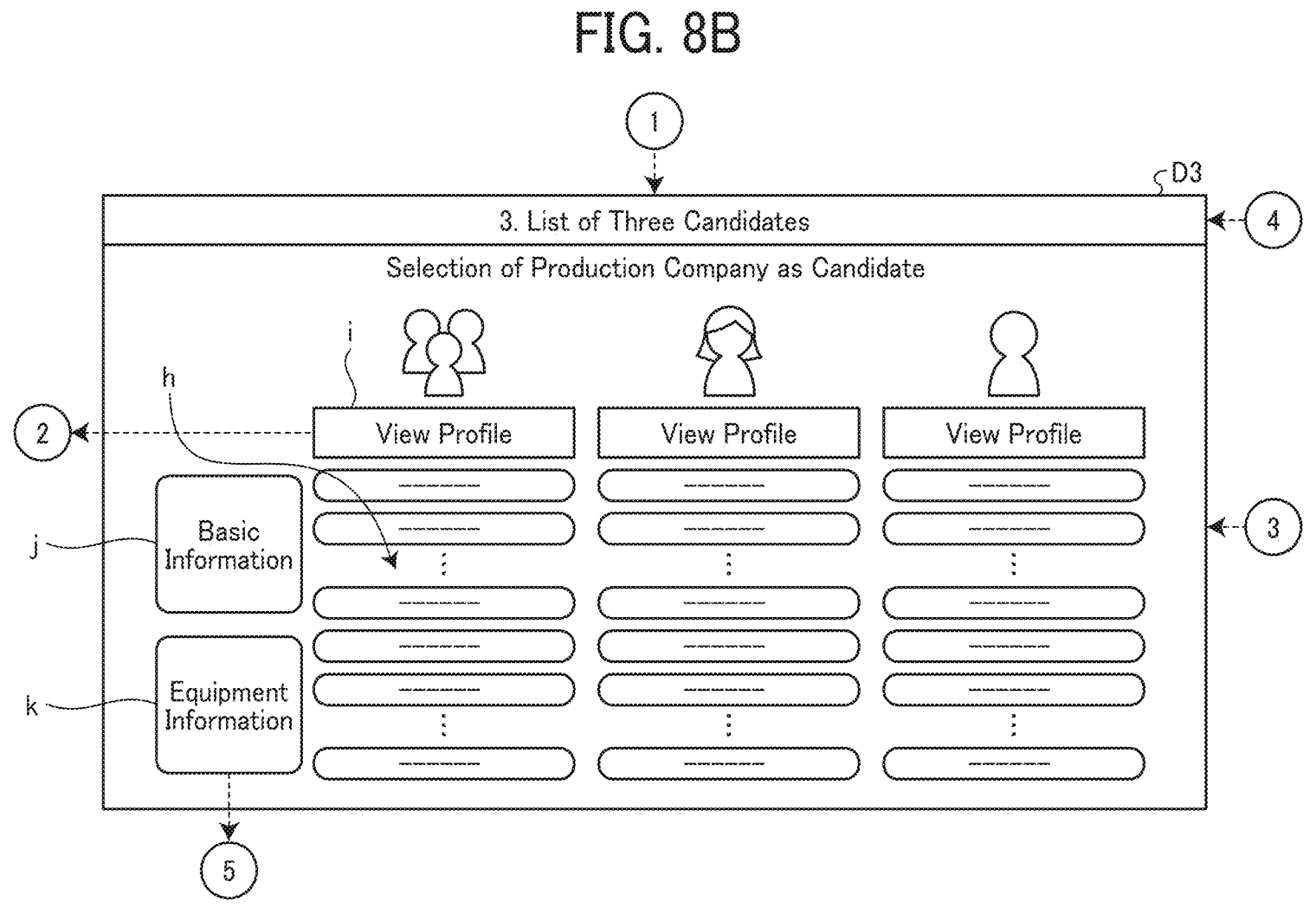

3. List of Three Candidates

Selection of Production Company as Candidate

View Profile

View Profile

View Profile

Basic Information

Equipment Information

FIG. 8C

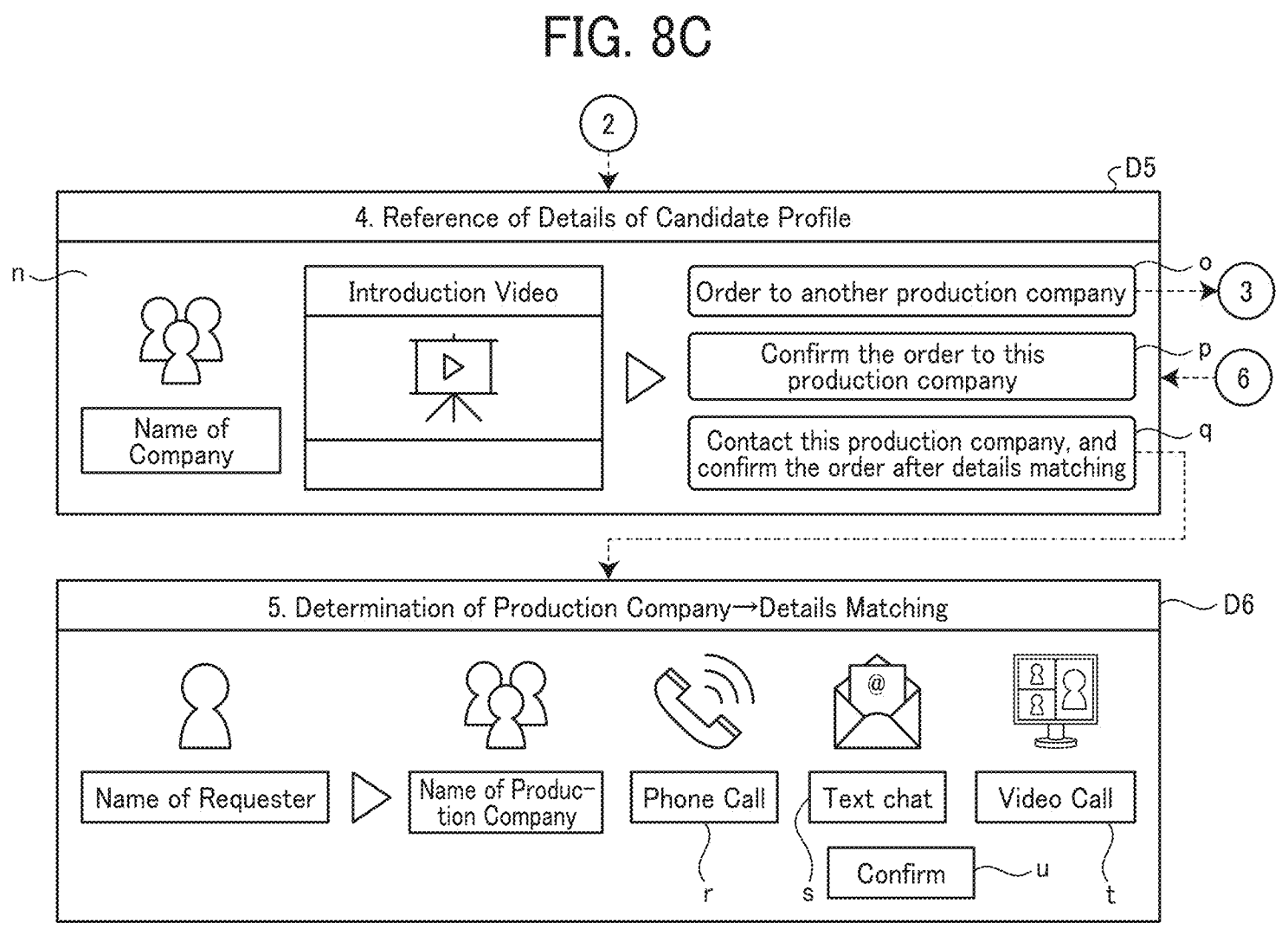

4. Reference of Details of Candidate Profile

Name of Company

Introduction Video

Order to another production company

Confirm the order to this production company

Contact this production company, and confirm the order after details matching

5. Determination of Production Company→Details Matching

Name of Requester

Name of Production Company

Phone Call

Text chat

Video Call

Confirm

PRODUCTION MANAGEMENT SYSTEM, NON-TRANSITORY RECORDING MEDIUM, AND PRODUCTION MANAGEMENT METHOD

CROSS-REFERENCE TO RELATED APPLICATIONS

This patent application is based on and claims priority pursuant to 35 U.S.C. § 119 (a) to Japanese Patent Application Nos. 2023-059540, filed on Mar. 31, 2023 and 2024-037553, filed on Mar. 11, 2024, in the Japan Patent Office, the entire disclosure of each is hereby incorporated by reference herein.

BACKGROUND

Technical Field

Embodiments of the present disclosure relate to a production management system, a non-transitory recording medium, and a production management method.

Related Art

In the related art, a system is known, which is used by a company that receives an order through a network, and produces and sells a product such as a T-shirt.

In operating the above-described system, for example, a company that owns original contents may desire to match with another company when the company lacks resources (production equipment) in producing a product or when the company deals with a product that cannot be produced with the production equipment owned by the company.

SUMMARY

In one aspect, a production management system includes circuitry to store in a memory profile information on a plurality of production companies, each production company owning at least one production site having production equipment connected to a network, display the profile information of the plurality of production companies to be viewed by a user of the production equipment, and receive selection of one of the plurality of production companies with which an order of a product to be produced is placed.

In another aspect, a non-transitory recording medium carrying computer readable codes for controlling a computer system to perform a method that includes storing in a memory profile information on a plurality of production companies, each production company owning at least one production site having production equipment connected to a network, displaying the profile information of the plurality of production companies to be viewed by a user of the production equipment, and receiving selection of one of the plurality of production companies with which an order of a product to be produced is placed.

In another aspect, a production management method includes storing in a memory profile information on a plurality of production companies, each production company owning at least one production site having production equipment connected to a network, displaying the profile information of the plurality of production companies to be viewed by a user of the production equipment, and receiving selection of one of the plurality of production companies with which an order of a product to be produced is placed.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 2 is a block diagram illustrating a hardware configuration of a computer according to the first embodiment of the present disclosure;

FIG. 3 is a block diagram illustrating a hardware configuration of a direct-to-garment (DTG) printer according to the first embodiment of the present disclosure;

FIG. 5 is a diagram illustrating an example of order information according to the first embodiment of the present disclosure;

FIG. 6 is a diagram illustrating an example of the profile information of a production company, according to the first embodiment of the present disclosure;

FIG. 7 is a diagram illustrating an example of equipment information according to the first embodiment of the present disclosure;

FIGS. 8A to 8D (FIG. 8) are diagrams illustrating the transition of a production management screen that can be viewed by an order requester, according to the first embodiment of the present disclosure;

FIG. 9 is a diagram illustrating a flow of placing an order of production, according to the first embodiment of the present disclosure;

FIG. 10 is a diagram illustrating an example of usage of a product production and sales system according to a modification of the first embodiment of the present disclosure;

FIG. 11 is a diagram illustrating an example of usage of a product production and sales system according to another modification of the first embodiment of the present disclosure;

Figure 1:
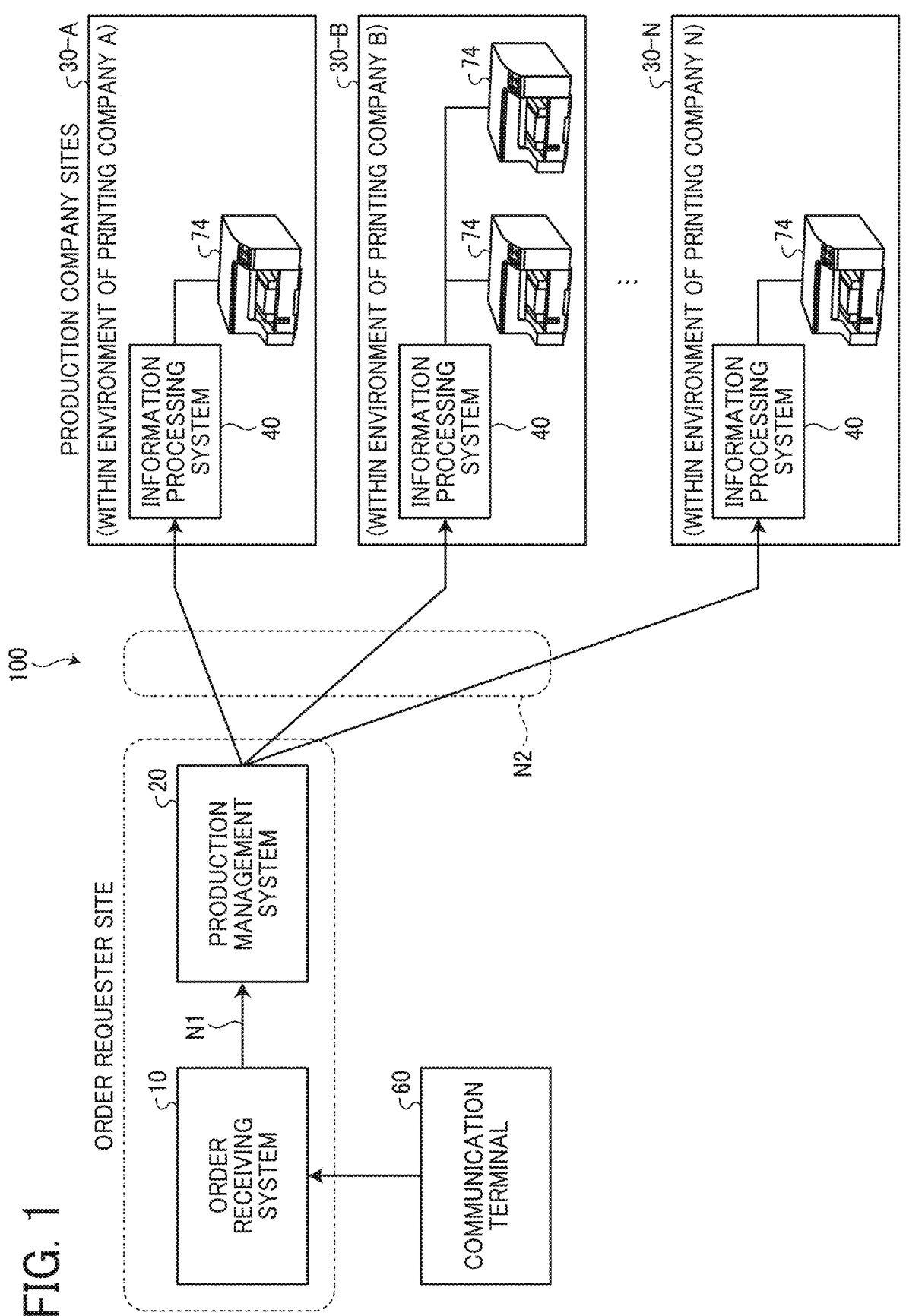
FIG. 1 is a diagram illustrating an overall configuration of a product production and sales system that includes a production management system, according to a first embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A production management system, a non-transitory recording medium, and a production management method according to embodiments of the present disclosure are described in detail below with reference to the accompanying drawings.

In some cases where the company desires to match with another company to produce the product, the companies are automatically matched based on the profiles of the companies registered in advance.

On the other hand, as demand for a wide variety of products in small-volume production has been increasing, companies that use outsourcing services currently seek secure and reliable matching with other companies, emphasizing the expected quality.

In the following, a production management system, a program stored on a non-transitory recording medium, and a production management method are described, which can support matching between production companies such that the production companies can complement the strengths and weaknesses with each other.

First Embodiment

FIG. 1 is a diagram illustrating an overall configuration of a product production and sales system that includes a production management system, according to a first embodiment of the present disclosure.

As illustrated in FIG. 1, a product production and sales system 100 according to the present embodiment includes an order receiving system 10 for receiving order information, a production management system 20, and information processing systems 40, which are communicable with each other via a network N1. The information processing systems 40 are disposed in production site systems 30 arranged in production sites of a plurality of production companies. In the following description, any one of the information processing systems 40 is referred to as an information processing system 40. Also, any one of the production site systems 30 is referred to as a production site system 30. In general, the order information is transmitted from the order receiving system 10 to the production site system 30 of a production company via the production management system 20. The production company includes, for example, a creator who is responsible for designing a product to be produced.

The network N1 is a wide area network (WAN) such as the Internet. The network N1 may include, for example, a WIDE AREA ETHERNET or a virtual private network (VPN). The network N1 may be wired or wireless, or a combination of wired and wireless networks. The network N1 may include wireless communication of, for example, the third generation (3G), the fourth generation (4G), and the fifth generation (5G). In addition, a network N2 such as a local area network (LAN), WIRELESS FIDELITY (Wi-Fi), or a WAN is installed in the production sites.

A communication terminal 60 is an information processing terminal operated by a purchaser who places an order on the order receiving system 10 or an operator of a production company that serves as an order requester in the production management system 20. The communication terminal 60 may be, for example, a desktop personal computer (PC), a laptop PC, a smartphone, or a tablet terminal, which operates on a general-purpose operating system (OS) such as WIN- DOWS, MAC OS, ANDROID, or IOS. In addition, the communication terminal 60 may be any information processing terminal on which a web browser or a native application operates and which can communicate with the order receiving system 10.

The order receiving system 10 is implemented by one or more information processing apparatuses. The order receiving system 10 is, for example, an electronic commerce (EC) site. When the purchaser accesses the EC site using the communication terminal 60, the order receiving system 10 provides the communication terminal 60 with a screen on which a list of products (for example, apparel products) to be produced is displayed. The order receiving system 10 receives order information of an apparel product selected by the purchaser operating the communication terminal 60. The sale of products to be produced through the EC site is called electronic commerce (e-commerce). One or more order receiving systems 10 may exist.

Each order receiving system 10 places an order of a product to the production management system 20 corresponding to the product to be produced. For the sake of convenience of description, the product to be produced in the present embodiment is an apparel product such as a T-shirt. However, the product to be produced may be, for example, bottoms, tops, underwear, shoes, a hat, or a bag, and is not limited thereto. The order receiving system 10 may receive an order for a product produced using a three-dimensional (3D) printer as well as a two-dimensional printer.

It is assumed that the production company serving as the order requester that uses the production management system 20 of the present embodiment does not have, for example, a factory for production, or has only a small-scale factory for production. For this reason, the production management system 20 requests the production site system 30 of another production company to produce the apparel product that is a product to be produced.

The production management system 20 is one or more information processing apparatuses that receive the order information of the apparel product and place the order of the product to the production site system 30 (information processing system 40) of a production site owned by the other production company. The production management system 20 displays the profile information of a production company owning a production site, and allows the order requester to view the profile information and request production to a production site of a production company as desired. The configuration of the production management system 20 is described later in detail.

In the production management system 20, the profile information and equipment information of each production company are updated and stored as appropriate.

A system including the information processing system 40 disposed in a production site is referred to as the production site system 30. The production site system 30 includes one or more information processing systems 40 for receiving order information from the production management system 20 and various production equipment. In the case where the product to be produced is an apparel product, the production equipment includes one or more direct-to-garment (DTG) printers 74, a cutting machine, and a sewing machine. In FIG. 1, the DTG printers 74 are illustrated. In the following description, any one of the DTG printers 74 is referred to as a DTG printer 74. The production equipment included in the production site system 30 is not limited to these pieces of equipment described above, and may include any other pieces of equipment corresponding to the product to be produced. In the present embodiment, one or more DTG printers 74 are connected to the information processing system 40 of each production site system 30.

The information processing system 40 may be, for example, a desktop PC, a laptop PC, a smartphone, or a tablet terminal, which operates on a general-purpose OS such as WINDOWS, MAC OS, ANDROID, or IOS. In addition, the information processing system 40 may be any information processing terminal on which a web browser or a native application operates and which can communicate with the production management system 20.

The information processing systems 40 and the production management system 20 operate in cooperation with each other, for example, as a client-server system. In this case, the production management system 20 has the function of a web server. Specifically, the web server transmits, based on a uniform resource locator (URL) instructed by a web browser that serves as a client, various information such as a document described in a hypertext markup language (HTML) existing in the web server in accordance with a hypertext transfer protocol (HTTP). A web application is executed by the web browser and the web server communicating with each other. Specifically, the web application is an application that is executed when a program on the web browser and a program on the web server operate in cooperation with each other. The program on the web browser may be a program described in a programming language for the web browser such as JAVASCRIPT. On the other hand, an application that is not executed unless installed in the information processing system 40 is referred to as a native application. In the present embodiment, the applications executed by the information processing system 40 may be native applications.

The DTG printer 74 is an image forming apparatus that employs a screen printing method or an inkjet printing system, and is used for drawing a pattern on an apparel product to be produced. The DTG printer 74 may employ any printing method as long as the DTG printer 74 has the function of drawing a pattern on an apparel product, for example. Further, the DTG printer 74 may be a 3D printer.

The ink, droplet size of ink, temperature, and discharge control for optimizing the DTG printer 74 differ depending on the fabric of the apparel product to be produced. For this reason, a plurality of types of DTG printers 74, for example, one for cotton and one for polyester, is prepared at each production site. Even for printing on the same material, the DTG printer 74 that is most suitable for the apparel product in terms of color and dot per inch (dpi) is prepared in some cases. In addition, a plurality of DTG printers 74 of the same type may be prepared to print concurrently.

The communication terminal 60 registers the profile information of each production company that manages the production sites and is responsible for the production of products in the production management system 20.

On the other hand, the information processing system 40 provides the production management system 20 with the equipment information of the equipment under management. For example, the information processing system 40 obtains the operating state of the DTG printer 74 used by the production company by, for example, an equipment monitoring system 32 (see FIG. 4) to be described later, and reflects the obtained operating state to the equipment information.

The production management system 20 may communicate with a transportation management system and an enterprise information system other than the systems illustrated in the drawings. The transportation management system is often a system used by a transportation company. The transportation management system manages delivery (collection and shipment) of the apparel product based on a delivery destination of the apparel product input from the information processing system 40. The enterprise information system manages, for example, purchasers, orders, deliveries, deposits, and payments.

The order receiving system 10 and the production management system 20 may be located on a cloud or on the premises. In FIG. 1, the information processing system 40 is arranged on the premises, but the information processing system 40 is often arranged on the cloud. The order receiving system 10 and the production management system 20 may be integrated into one system. The production management system 20 may be configured by a plurality of information processing apparatuses in which the functions of the production management system 20 are distributed, or a plurality of production management systems 20 may be arranged.

Hardware Configurations

Order Receiving System, Production Management System, Information Processing System, and Communication Terminal As illustrated in FIG. 2, each of the order receiving system 10, the production management system 20, the information processing system 40, and the communication terminal 60 has a configuration as a computer 500. FIG. 2 is a block diagram illustrating a hardware configuration of the computer 500 according to the first embodiment of the present disclosure. As illustrated in FIG. 2, the computer 500 is implemented by a computer. The computer includes a central processing unit (CPU) 501, a read-only memory (ROM) 502, a random-access memory (RAM) 503, a hard disk (HD) 504, a hard disk drive (HDD) controller 505, a display 506, an external device interface (I/F) 508, a network interface (I/F) 509, a bus line 510, a keyboard 511, a pointing device 512, an optical drive 514, and a medium interface (I/F) 516.

The CPU 501 controls the entire operation of the order receiving system 10, the production management system 20, the information processing system 40, and the communication terminal 60, to which the CPU 501 belongs. The ROM 502 stores a program such as an initial program loader (IPL) to boot the CPU 501. The RAM 503 is used as a work area for the CPU 501. The HD 504 stores various data such as a program. The HDD controller 505 controls the reading and writing of various data from and to the HD 504 under the control of the CPU 501. The display 506 displays various information such as a cursor, a menu, a window, characters, and images. The external device I/F 508 is an interface for connection with various external devices. Examples of the external devices in this case include, but are not limited to, a universal serial bus (USB) memory and various types of printers. The network I/F 509 is an interface for data communication through a communication network. The bus line 510 is, for example, an address bus or a data bus, which electrically connects the components or elements such as the CPU 501 illustrated in FIG. 2 to each other.

The keyboard 511 serves as an input device provided with a plurality of keys used for, for example, inputting characters, numerical values, and various instructions. The pointing device 512 serves as an input device used for, for example, selecting or executing various instructions, selecting an object to be processed, and moving a cursor being displayed. The optical drive 514 controls the reading and writing of various data from and to an optical recording medium 513, which is an example of a removable recording medium. Examples of the optical recording medium 513 include, but are not limited to, a compact disc (CD), a digital versatile disc (DVD), and a BLU-RAY disc. The medium I/F 516 controls the reading and writing (storing) of data from and to a recording medium 515 such as a flash memory.

Printer

Figure 3:
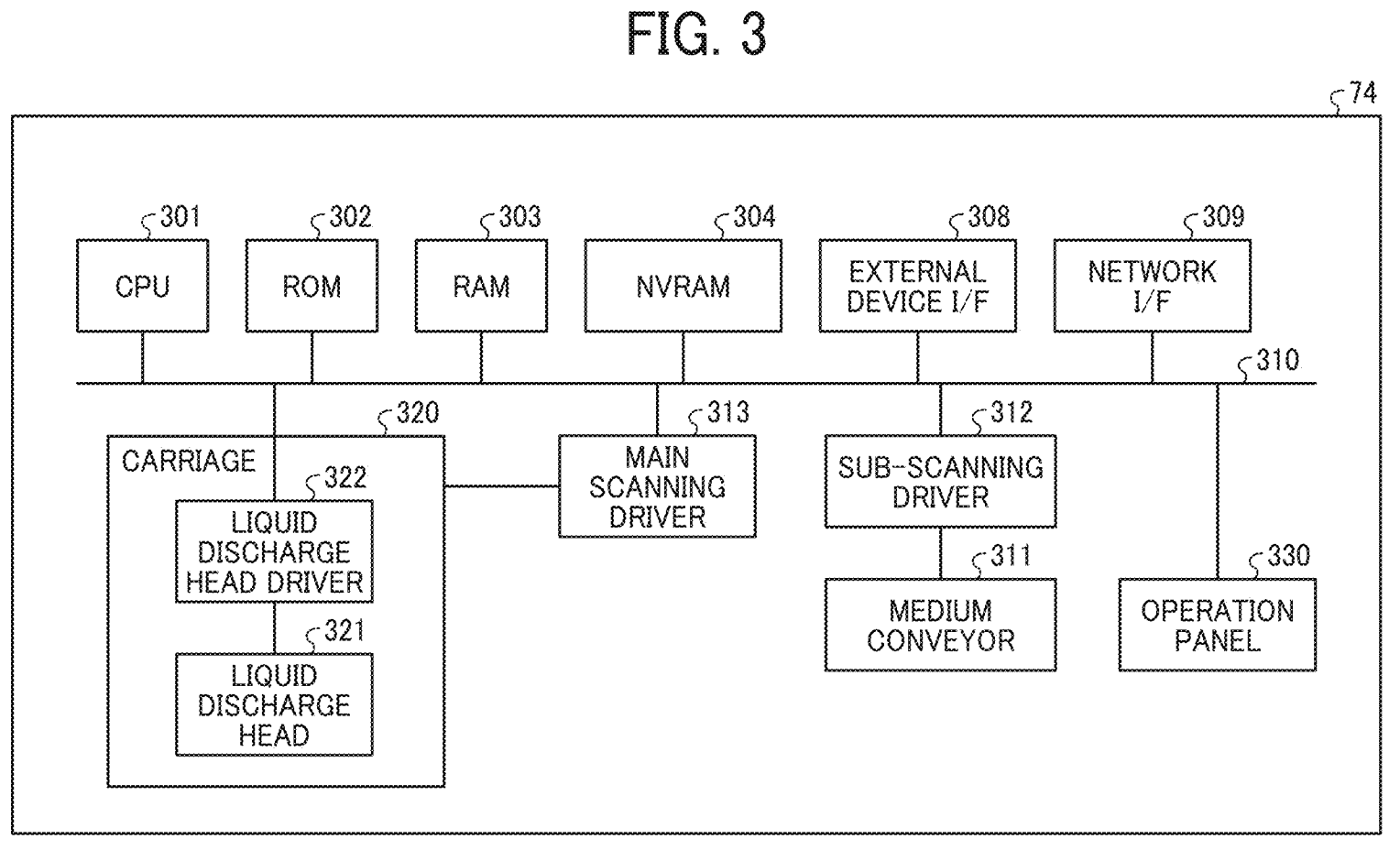

FIG. 3 is a block diagram illustrating a hardware configuration of the DTG printer 74 (an inkjet printer) according to the first embodiment of the present disclosure. As illustrated in FIG. 3, the DTG printer 74 includes a CPU 301, a ROM 302, a RAM 303, a non-volatile random-access memory (NVRAM) 304, an external device I/F 308, a network I/F 309, and a bus line 310. Further, the DTG printer 74 includes a medium conveyor 311, a sub-scanning driver 312, a main scanning driver 313, a carriage 320, and an operation panel 330. The carriage 320 includes a liquid discharge head 321 and a liquid discharge head driver 322.

The CPU 301 controls the entire operation of the DTG printer 74. The ROM 302 stores a program such as an IPL to boot the CPU 301. The RAM 303 is used as a work area for the CPU 301. The NVRAM 304 stores various data such as a program and retains the data even when the power of the DTG printer 74 is turned off. The external device I/F 306 is connected to a PC via, for example, a USB cable to communicate control signals or data to be printed with the PC. The network I/F 309 is an interface for data communication through a communication network such as the Internet. The bus line 310 is, for example, an address bus or a data bus for electrically connecting each component such as the CPU 301 with each other.

The medium conveyor 311 is, for example, a roller and a motor that drives the roller, and conveys an output medium in the sub-scanning direction along the conveyance path in the DTG printer 74. The sub-scanning driver 312 controls the movement of the medium conveyor 311 in the sub-scanning direction. The main scanning driver 313 controls the movement of the carriage 320 in the main scanning direction.

The liquid discharge head 321 of the carriage 320 includes a plurality of nozzles to discharge liquid such as ink. The liquid discharge head 321 is mounted on the carriage 320 such that a discharge face (i.e., nozzle face) of the liquid discharge head 321 faces the output medium. While moving in the main scanning direction, the liquid discharge head 321 discharges the liquid onto the output medium conveyed intermittently in the sub-scanning direction. Specifically, the liquid discharge head 321 discharges the liquid onto a predetermined position of the output medium, thus an image is formed on the output medium. The liquid discharge head driver 322 is a driver to control the driving of the liquid discharge head 321.

The operation panel 330 includes, for example, a touch panel that receives input from an operator and an alarm lamp, and causes, for example, current settings or a selection screen to be displayed.

The liquid discharge head driver 322 may be configured not to be mounted on the carriage 320 but to be connected to the bus line outside the carriage 320. Each of the main scanning driver 313, the sub-scanning driver 312, and the liquid discharge head driver 322 may serve as a function implemented by an instruction of the CPU 301 according to a program.

Functions

Figure 4:
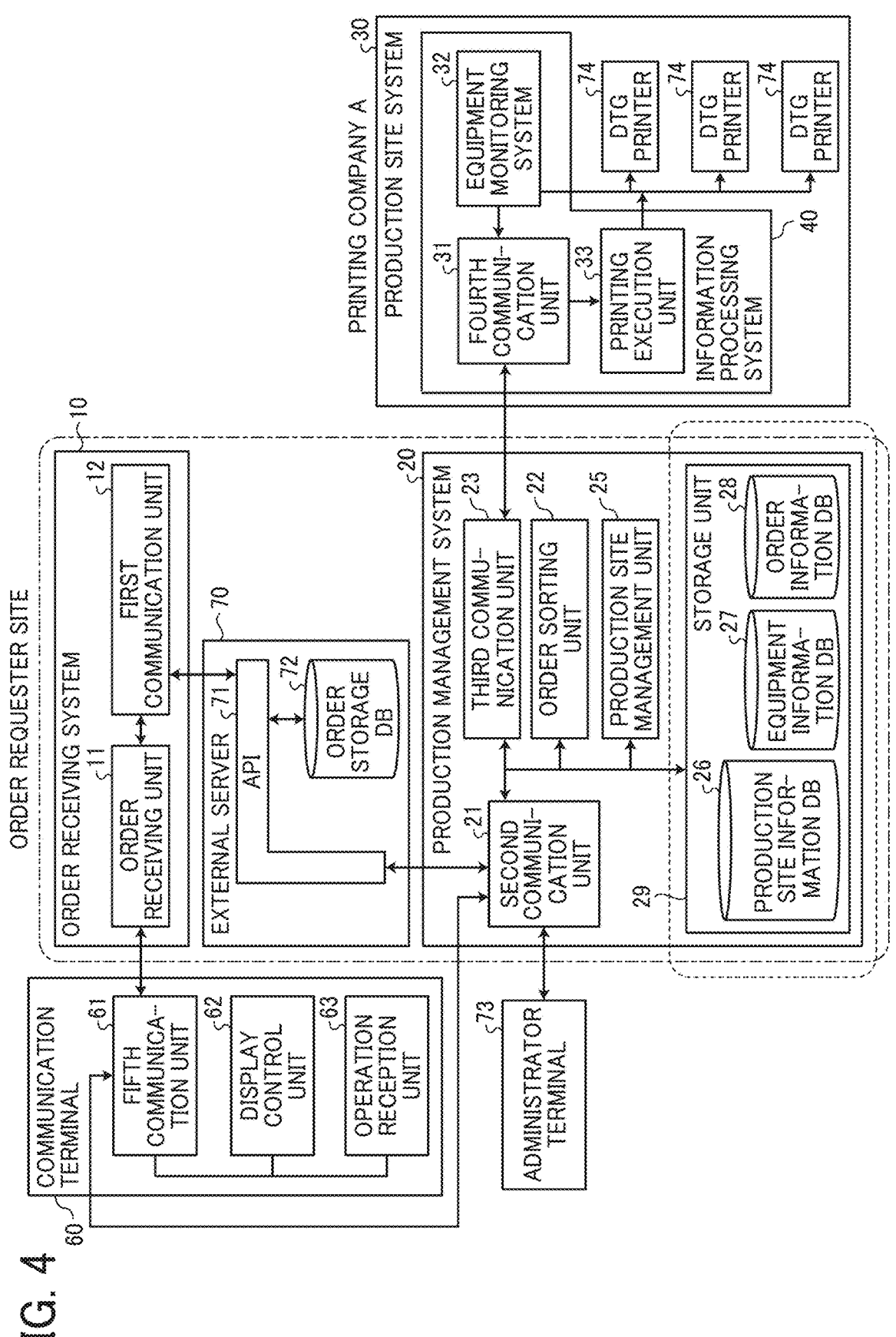
FIG. 4 is a block diagram illustrating a functional configuration of a product production and sales system according to the first embodiment of the present disclosure.

FIG. 4 is a block diagram illustrating a functional configuration of the product production and sales system 100 according to the first embodiment of the present disclosure.

Communication Terminal

The communication terminal 60 includes a fifth communication unit 61, a display control unit 62, and an operation reception unit 63. These functions of the communication terminal 60 are functions implemented by one of the components illustrated in FIG. 2 operating in accordance with instructions from the CPU 501 according to a program (a web browser or a native application) loaded from the HD 504 onto the RAM 503.

The fifth communication unit 61 communicates with the order receiving system 10 to receive screen information for the communication terminal 60 to display a screen of the EC site based on the screen information. In addition, the fifth communication unit 61 transmits the order information input to an individual screen by the purchaser to the order receiving system 10.

Furthermore, the fifth communication unit 61 communicates with the production management system 20 to receive screen information for the communication terminal 60 to display a screen based on the screen information, on which the order requester places the order of the product.

The display control unit 62 analyzes the screen information of the screen received from the order receiving system 10 or the screen information of the screen received from the production management system 20, and displays the screen on the display 506. The operation reception unit 63 receives an operation of the purchaser (for example, an input of order information to an individual screen) on the communication terminal 60 or an operation of the order requester (for example, an input of selection information for selecting a production company to an individual screen) on the communication terminal 60.

Order Receiving System

The order receiving system 10 includes an order receiving unit 11 and a first communication unit 12. These functions of the order receiving system 10 are functions implemented by one of the components illustrated in FIG. 2 operating in accordance with instructions from the CPU 501 according to a program loaded from the HD 504 onto the RAM 503.

The order receiving unit 11 provides an EC site and receives order information of an apparel product purchased by the purchaser using a web browser operating on the communication terminal 60 operated by the purchaser.

The EC site receives the order through a web application implemented by cooperation between a program executed by the web server and a program executed by the web browser. The order receiving unit 11 generates screen information of a screen displayed by the web browser. The screen information is a program described in formats such as the HTML, an extensible markup language (XML), a script language, and a cascading style sheet (CSS). Typically, the structure of a web page is determined by the HTML, the operation of the web page is defined by the script language, and the style of the web page is determined by the CSS.

On the communication terminal 60, a native application for purchasing an apparel product to be produced may operate, instead of the web application. In this case, the native application has the structure of the screen, and the contents to be displayed are transmitted in a format such as the XML from the order receiving system 10 to the communication terminal 60.

The first communication unit 12 transmits the order information to the external server 70 each time an order is received. Accordingly, the first communication unit 12 can transmit the order information of the apparel product to be produced for an order to the external server 70 immediately after the order is received.

The external server 70 stores the order information transmitted from the order receiving system 10 in an order storage database (DB) 72 via an application programming interface (API) 71. In addition, the external server 70 transmits the order information stored in the order storage DB 72 to the production management system 20 via the API 71.

In the present embodiment, the order receiving system 10 stores the order information in the external server 70, but the storage unit for the order information is not limited thereto. The order information may be stored in, for example, the HD 504 included in the order receiving system 10.

Order Information

The order information is described below.

FIG. 5 is a diagram illustrating an example of the order information according to the first embodiment of the present disclosure. The order information is information on an order of an apparel product to be produced. As illustrated in FIG. 5, the order information includes, for example, an order identification (ID), a job ID, an order date and time, a purchaser ID, a delivery destination, a stock keeping unit (SKU), a print image, a print position, and a finished product image. The delivery destination, the SKU, and the print position in the order information are determined by the purchaser, and thus are transmitted from the order receiving system 10. Regarding the print image, only the identification information of the print image is transmitted from the order receiving system 10 in some cases, and the print image itself is transmitted from the order receiving system 10 in other cases.

The order ID is identification information for uniquely identifying an order. The "ID" is an abbreviation of an "identification" and indicates an identifier or identification information. The ID is a name, a code, a character string, a numerical value, or a combination of one or more of these items, which is used for uniquely distinguishing a specific object from a plurality of objects. The order receiving unit 11 assigns an order ID. In the case where multiple apparel products are ordered in one order and the delivery address of the multiple apparel products is the same, these multiple apparel products are bundled. In this case, although one order ID is assigned to the order, one job ID is assigned to each apparel product to be produced.

The job ID is identification information of a print job. The job ID is assigned as many times as the number of times of printing required to produce one apparel product. When an apparel product to be produced is finished with one time of printing, one job ID is assigned to one apparel product (for example, a T-shirt). The order receiving unit 42 assigns the job ID.

The order date and time is the date and time when the order information is received by the order receiving unit 11.

The purchaser ID is identification information for identifying a purchaser who purchases the apparel product to be produced. The purchasers who purchased in the past are recorded, and the same purchaser ID is assigned to the same purchaser. In the case of a purchaser who purchases for the first time, the order receiving unit 11 assigns a purchaser ID to the purchaser.

The delivery destination is a destination to which the apparel product to be produced is delivered.

The SKU is an identification number of a fabric, which identifies one type of fabric among a variety of series, colors, and sizes. In other words, the SKU is identification information of a fabric on which a print image is printed. The SKU allows even the same products to be treated as different products when the same products are made of fabrics different in color, size, or packaging.

The print image is an image to be printed on the fabric. The print position indicates on which part (e.g., front, back, chest, or arm) of the fabric the print image is to be printed.

The finished product image is an image obtained by overlaying the print image on an image of a material.

Production Management System

The production management system 20 includes a second communication unit 21, an order sorting unit 22, a third communication unit 23, a production site management unit 25, and a storage unit 29. These functions of the production management system 20 are functions implemented by one of the components illustrated in FIG. 2 operating in accordance with instructions from the CPU 501 according to a program loaded from the HD 504 onto the RAM 503. The storage unit 29 is implemented by the RAM 503 and the HD 504 illustrated in FIG. 2. The storage unit 29 includes a production site information DB 26, an equipment information DB 27, and an order information DB 28.

The second communication unit 21 receives the order information from the external server 70. The order sorting unit 22 selects a production site to place the order with from a plurality of production sites, for each piece of order information or for a plurality of pieces of order information collectively.

The second communication unit 21 transmits and receives information to and from the communication terminal 60.

The second communication unit 21 also transmits and receives information to and from an administrator terminal 73 used by an administrator who administrates the production management system 20.

When selecting a production site according to the apparel product to be produced, the order sorting unit 22 displays, for example, the profile information of the production company owning the production site to be viewed by the order requester and selects the production site of the production company desired by the order requester. The order sorting unit 22 transmits order information for requesting production of the apparel product to be produced to the production site selected by the order sorting unit 22.

The order sorting unit 22 provides a site for selecting a production site to place an order with and receives information on the production site selected by the order requester using the web browser operating on the communication terminal 60 operated by the order requester.

The site for selecting a production site to place an order with receives, through a web application implemented by cooperation between a program executed by the web server and a program executed by the web browser, the information on the production site with which the order for the apparel product is placed. The order sorting unit 22 generates screen information of a screen displayed by the web browser. The screen information is a program described in formats such as the HTML, the XML, the script language, and the CSS. Typically, the structure of a web page is determined by the HTML, the operation of the web page is defined by the script language, and the style of the web page is determined by the CSS.

On the communication terminal 60, a native application for selecting a production site to place an order with may operate, instead of the web application. In this case, the native application has the structure of the screen, and the contents to be displayed are transmitted in a format such as the XML from the production management system 20 to the communication terminal 60.

The third communication unit 23 transmits the order information to the information processing system 40 arranged in one of the production site systems 30 selected by the order sorting unit 22.

The production site management unit 25 manages various information stored in the production site information DB 26. The production site management unit 25 allows the profile information of the production companies registered in the production site information DB 26 to be viewed by the production company serving as the order requester. The production company serving as the order requester can request production (place an order of production) to a production company as desired based on the profile information that the production company serving as the order requester views. The profile information of the production companies registered in the production site information DB 26 can be viewed by all registered production companies.

The production site information DB 26 stores the profile information of each production company registered by the information processing systems 40 arranged in the production site systems 30.

FIG. 6 is a diagram illustrating an example of the profile information of a production company, according to the first embodiment of the present disclosure. As illustrated in FIG. 6, the production site information DB 26 stores various pieces of profile information as well as a piece of production company ID for identifying a production company. The profile information of the production company illustrated in FIG. 6 includes, for example, the following contents.

1. Location (Production Site)
    2. Owned Production Equipment
    3. Specialty Products (Introduction)
    4. Orderable Products (Introduction)
    5. Production Capacity (per day, per week)
    6. Vision and Strengths on Business (Introduction)
    7. SDGs Activities
    8. Profile of Production Company (Self-introduction)

In this way, the profile information of the production company is stored. In the case of the outsourcing service, since the profiles of the production companies can be viewed, the production company serving as the order requester can place an order with a production company with confidence after checking the identity of the production company. In particular, the products produced in the past and the information on the production results are useful as materials for determining a production site to place an order with. In addition, the production company itself can use the information on the production results as an appeal for obtaining a new job as the information on the production results is updated.

In particular, the production site information DB 26 stores, as the profile information of the production company, information on products that can be produced by the production equipment owned by the production company. Thus, the production company can receive orders mainly for the media with which the production company is familiar in production in the regular business. This is an advantage for the production company that receives the orders. On the other hand, since the production company serving as the order requester can order a product that each production company is accustomed to producing, the production company serving as the order requester can obtain a sense of confidence in the quality. This is an advantage for the production company serving as the order requester. Further, since the products that can be produced by each production company can be referred to on the production management system 20, the production company serving as the order requester can appropriately select a production company.

The equipment information DB 27 stores the operating state of the DTG printer 74 used by each production company registered by the information processing system 40 as equipment information.

FIG. 7 is a diagram illustrating an example of the equipment information according to the first embodiment of the present disclosure. As illustrated in FIG. 7, the equipment information DB 27 stores various pieces of equipment information as well as a piece of equipment ID for identifying the DTG printer 74 used by each production company. The equipment information illustrated in FIG. 7 includes, for example, the following items.

1. Network Information
    2. Output Medium
    3. Application
    4. Equipment Operating State Information The contents of the network information are, for example, an internet protocol (IP) address and a media access control (MAC) address. The content of the output medium is, for example, a garment. The content of the application is, for example, a T-shirt.

The equipment operating state information includes, for example, the following contents.

1. Total Production Volume
    2. Equipment Maintenance History (Including repair history)
    3. Equipment Operating Frequency As described above, the operating state of the DTG printer 74 used by the production company is obtained by the equipment monitoring system 32 (see FIG. 4) of the information processing system 40 and is reflected in the equipment operating state information.

In particular, the equipment information DB 27 stores, as the equipment information, the equipment operating state information of the production equipment. Accordingly, the production company serving as the order requester can refer to the operating state of the production equipment to forecast a delivery date in response to an order, and the equipment operating frequency of an individual piece of production equipment and the repair history to assume the state of the individual piece of production equipment. Thus, the production company serving as the order requester can place an order of production to another production company at an appropriate time.

By using such equipment information stored in the equipment information DB 27, the production company serving as the order requester can check the operation history and the operating state of the other production company. Thus, the production company serving as the order requester can use the equipment information to determine the production company with which the order is placed.

By using the profile information of the production company stored in the production site information DB 26 and the equipment information stored in the equipment information DB 27, the order requester can select a production company by oneself in accordance with the requirements of the production company serving as the order requester. In other words, the production company serving as the order requester is matched with the production company not mechanically but based on the requirements of the production company serving as the order requester.

The order information DB 28 stores order information for the other production company.

The various items of the profile information and the equipment information illustrated in FIGS. 6 and 7 are merely given by way of example. The items may be determined by the production company using the production management system 20 as desired.

Information Processing System

The information processing system 40 includes a fourth communication unit 31, the equipment monitoring system 32, and a printing execution unit 33. These functions of the information processing system 40 are functions implemented by one of the components illustrated in FIG. 2 operating in accordance with instructions from the CPU 501 according to a program loaded from the HD 504 onto the RAM 503.

The fourth communication unit 31 receives order information from the production management system 20, generates a print job, and transmits the print job to the DTG printer 74. In other words, the production company receives an order when obtaining a notification of a production request as a result of the order requester oneself viewing the profile information of the production company on the production management system 20.

In response to receiving the order information, the printing execution unit 33 generates raster image processor (RIP) data corresponding to the DTG printer 74 based on the order information. The RIP is an abbreviation of a raster image processor, and means converting a print image, which is digital data generated by various applications, into a format suitable for printing such as a bitmap.

Note that, depending on the type of the DTG printer 74, for example, different inks (e.g., a set of yellow, magenta, cyan, and black inks or a set of yellow, magenta, cyan, and black inks plus a white ink) are used for each type, the amount of each color ink to be used varies according to the color tone to be reproduced, or the data format that the DTG printer 74 can identify differs. For this reason, the printing execution unit 33 generates RIP data suitable for the type of the DTG printer 74.

The printing execution unit 33 causes the DTG printer 74 to print an image of print data on which the processing of the RIP is executed.

The equipment monitoring system 32 monitors the operating state of the DTG printer 74 using a communication protocol such as a simple network management protocol (SNMP). More specifically, the equipment monitoring system 32 obtains the state of the DTG printer 74 to remotely monitor the DTG printer 74. The equipment monitoring system 32 obtains, for example, the operating state of the DTG printer 74 as described below.

1. Total Production Volume
　　2. Equipment Maintenance History (Including repair history)
　　3. Equipment Operating Frequency The equipment monitoring system 32 may be linked to dedicated software associated with each DTG printer 74, or may be linked to each DTG printer 74 through a web feature service (WFS) included in the production management system 20, which is directly linked to the DTG printer 74. Alternatively, the equipment monitoring system 32 may be linked to each DTG printer 74 through an API, or may be integrated into the production management system 20 based on a software development kit (SDK) published for the DTG printer 74.

The fourth communication unit 31 transmits the operating state of the DTG printer 74 obtained by the equipment monitoring system 32 to the production management system 20, and reflects the operating state to the equipment information stored in the equipment information DB 27. Preferably, the operating state of the DTG printer 74 is automatically updated by the production management system 20 periodically receiving information from the cloud.

Screen Operation

A case where screen transition performed by the order sorting unit 22 when the production company serving as the order requester places an order of printing with the other production company on the production management system 20 is described below.

FIGS. 8A to 8D (FIG. 8) are diagrams illustrating the transition of a production management screen that can be viewed by the order requester, according to the first embodiment of the present disclosure. In the present embodiment, a case where an apparel product to be produced on which a desired image is printed is described.

As illustrated in FIG. 8A, the order sorting unit 22 displays, as a production management screen, a selection screen D1 for selecting a service to be used. On the selection screen D1, three services of print order request, profile registration, and profile viewing can be selected. The production company serving as the order requester selects one of the three items ("print order request" a, "profile registration" b, and "profile viewing" c) on the selection screen D1, and proceeds to a desired service to be used. Note that the production company serving as the order requester who has been registered for the first time is required to register a profile on the selection screen D1.

In the present embodiment, a case where the print order request a is selected on the selection screen D1 is described. When the print order request a is selected on the selection screen D1, the order sorting unit 22 causes the display screen to transition to a selection screen D2 for selecting the contents of the print order request.

It is assumed that an order requester, which is a production company whose profile has already been registered, places an order of printing. The production company serving as the order requester first inputs the contents of the print order request ("selection of print order product" d, order basic information (a "expected delivery date" e, a "delivery destination" f)) on the selection screen D2, and then selects an "image data registration method" g. In the selection of print order product d, product information such as the type, size, color, and quantity of the apparel product is selected. In the image data registration method g, a radio button corresponding to either "order using image owned by the company" or "order using image owned by the requester" is selected, and then image data is selected or registered.

When the production company serving as the order requester inputs the contents of the print order request in the selection of print order product d and selects a method in the image data registration method g, the order sorting unit 22 causes the display screen transition to a candidate list screen D3 in FIG. 8B, on which other production companies are presented in a list as candidates.

The production company serving as the order requester can obtain a list of candidates for determining a production company with which the order is placed on the list screen D3. The production companies are automatically listed as the candidates based on the contents of profile information registered for each of the production companies and the object ordered by the order requester (product information, order basic information). On the candidate list screen D3, a "profile summary" h for each candidate listed in the candidate list is presented in the top layer of the screen. Note that the profile information and the equipment information on a desired candidate (a production company to place the order of printing with) can be viewed in detail from the candidate list. After operating "view profile" i for each candidate, by operating "basic information" j or "equipment information" k, the display screen is caused to transition to a screen on which details of the profile of the desired candidate are presented.

Figure 8D:
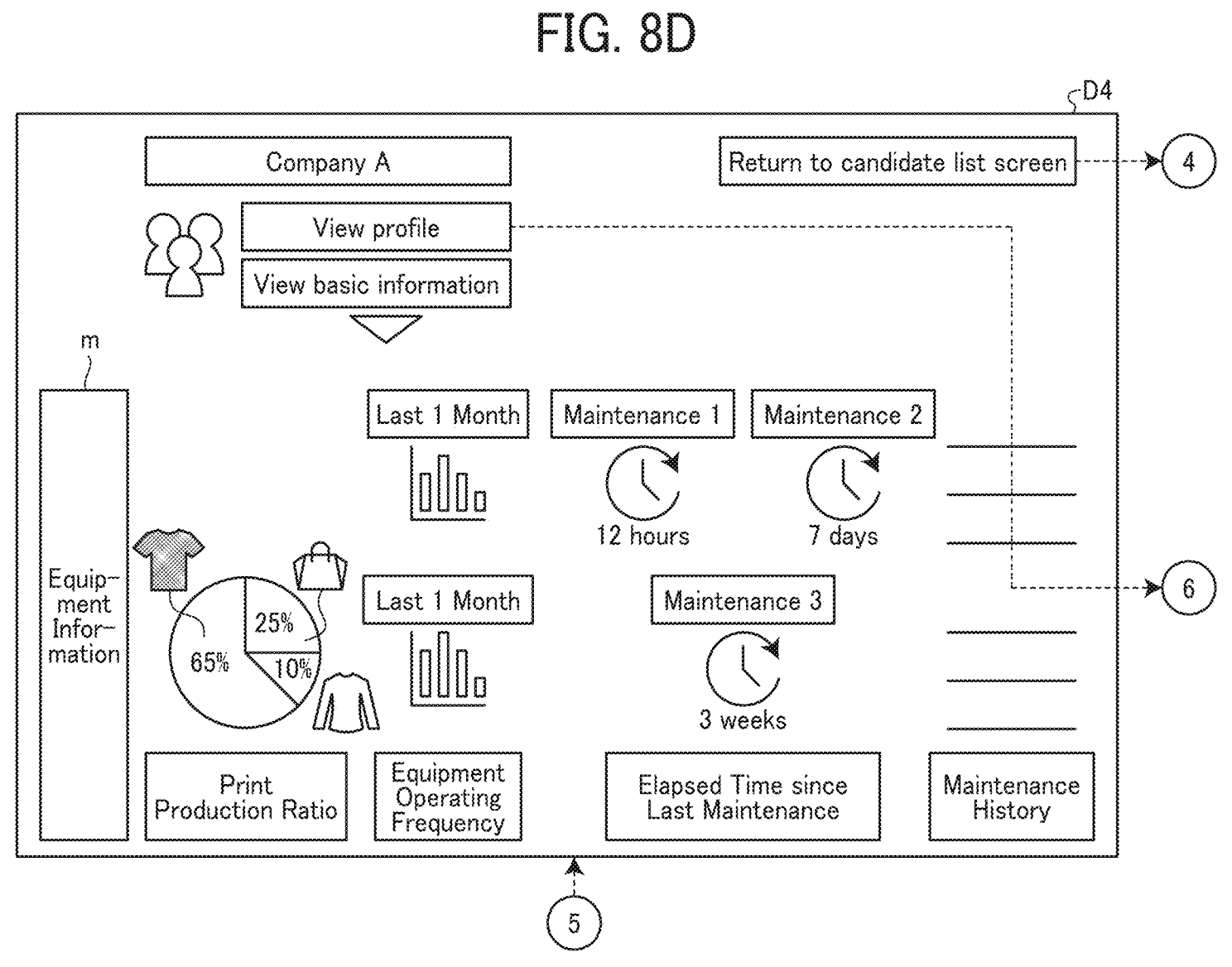

For example, when the production company serving as the order requester operates to select the "equipment information" k on the candidate list screen D3, the order sorting unit 22 causes the display screen to transition to an equipment information viewing screen D4 in FIG. 8D, on which details of the equipment information are presented.

In "equipment information" m presented on the equipment information viewing screen D4, information is visualized by being graphed or being displayed as a list in text, depending on the viewing item. The equipment information m includes, for example, a print production ratio, an equipment operating frequency of the DTG printer 74, an elapsed time since the last maintenance of the DTG printer 74, and a maintenance history of the DTG printer 74. The production company serving as the order requester can view the equipment information and select a production company to place the order with. Note that a general-purpose business intelligence (BI) tool may be used for visualizing (e.g., converting into a graph) the equipment information m.

For example, when the production company serving as the order requester operates to select the "view profile" i on the candidate list screen D3, the order sorting unit 22 causes the display screen to transition to a profile screen D5 in FIG. 8C, on which "detailed information" n of the profile information, such as the name of the production company and an introduction video of the production company, can be viewed.

Thus, the production company serving as the order requester can view the introduction video of the production company to place the order of printing with on the profile screen D5. As a result, the production company serving as the order requester can determine whether to place an order to this production company or another production company. In the present embodiment, the advantage is that a product company to place the order of printing with is determined after the profile and the strengths of the production company are checked on the production management system 20.

Note that the production company registered in the production management system 20 registers the information (the name of the production company, the introduction video of the production company), which is the profile (self-introduction) of the production company itself, in the production site information DB 26 at the same time as or at a later date of the profile registration.

In the case where the information (the name of the production company, the introduction video of the production company) which is the profile (self-introduction) of the production company itself cannot be disclosed due to unavoidable reasons, "no information" is presented on the profile screen D5.

The production company serving as the order requester selects one of "order to another production company" o, "confirm the order to this production company" p, and "contact this production company, and confirm the order after details matching" q on the profile screen D5.

When the production company serving as the order requester selects the "order to another production company" o, the order sorting unit 22 causes the display screen to transition to the candidate list screen D3.

When the production company serving as the order requester selects the "confirm the order to this production company" p, the order sorting unit 22 determines the production company to place the order with.

When the production company serving as the order requester selects the "contact this production company, and confirm the order after details matching" q, the order sorting unit 22 causes the display screen to transition to a details matching screen D6 in FIG. 8C.

On the details matching screen D6, "phone call" r, "text chat" s, and "video call" t are displayed to be selectable as means for contacting the production company serving as a candidate for the order. The order requester can directly contact the production company to place the order with based on the profile information (phone call, text chat, video call) registered for the production company in order to ensure all details are adjusted without omission. The order is confirmed by the production company serving as the order requester operating a button of "confirm" u after matching the details.

Note that all pieces of information on the order request may not be confirmed online. In particular, in the case of orders received and placed between corporations, which is called "Business to Business (B to B)," detailed matching matters (e.g., arrangement of images of image data, split delivery of products on different dates) are expected to occur. Even in such a case, matching can be performed through direct negotiation between the production companies that are users of the production management system 20. Communication can be facilitated by optionally utilizing tools used between each production company, such as a phone call, an online video call, and an online chat message.

A case where a production company A that uses the production management system 20 included in the product production and sales system 100 becomes an order requester and places an order of production with a production company B through the production management system 20 is described below in detail.

Figure 9:
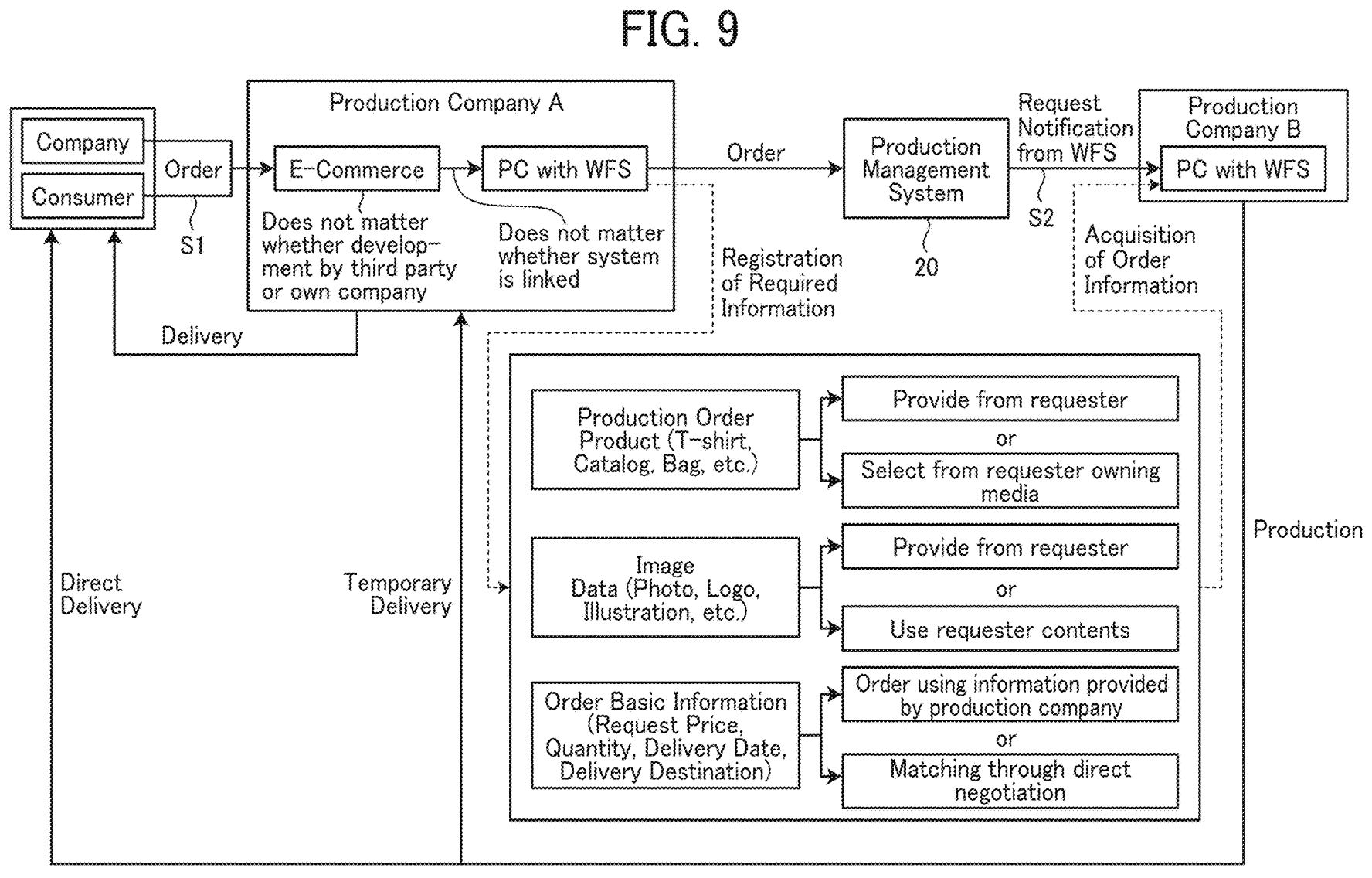

FIG. 9 is a diagram illustrating the flow of placing the order of production, according to the first embodiment of the present disclosure. As illustrated in FIG. 9, the production company A receives an order for, for example, a T-shirt as a product for sale, a catalog, or a novelty from a company via the order receiving system 10 (step S1).

The production company A requests the production to the production company B (step S2) via the production management system 20. The production company B has been selected based on determination that the production company B is the most suitable production company to place the order with after the profile information being viewed in advance. The production company A registers information used for the production in the production management system 20 when placing the order. The information used for the production includes, for example, the contents of the order of the production (selection of print order product, order basic information (such as expected delivery date)) and the image data presented on the selection screen D2 (see FIG. 8A).

The provider of the contents differs depending on the contents of the order. Some contents are provided by the production company A and other contents are provided by the production company B using the contents or resources owned by the production company B. The provider is not specified in detail in the production management system 20 according to the present embodiment. The provider is assumed to be defined by agreement between the users of the production management system 20.

As described above, the production management system 20 according to the present embodiment is used when a company that produces and sells products such as goods uses the outsourcing service. When the production of a product is outsourced through the production management system 20, a production company serving as an order requester can check information (profile information, equipment information) on a production company responsible for producing the product and information (profile information, equipment information) on a creator responsible for designing the product on the production management system 20, and order the product to a combination of the production company and the creator as desired. In other words, the production company serving as the order requester can select other production companies (including a creator).

For example, it is assumed that a production company serves as a creator, is confident in design, and has original contents, but lacks resources in printing for goods and cannot produce the goods with the production equipment owned by the production company. In this case, when the production company desires to procure such a commercial product that the production company itself cannot produce, the production company can be matched with other production companies.

By contrast, for example, a production company that does not own original contents and is not confident in design but owns a wide range of equipment that can output onto various kinds of print media (materials and media) can be matched with a production company serving as a creator in order to obtain a job (demand) and expand the business of new goods.

As described above, in the related art, the matching between production companies is automatically performed according to the contents that can be mechanically determined by, for example, artificial intelligence (AI) based on order request information. On the other hand, according to the present embodiment, a user who uses the above-described system can select another production company by oneself according to the requirements of a production company serving as an order requester, instead of mechanical matching. In other words, the matching between production companies is performed according to the requirements of the production company serving as the order requester. As a result, the production management system according to the present embodiment supports matching between production companies that complement the strengths and weaknesses of the production companies with each other.

The production company A serving as the order requester may serve as a creator, and the other production company B selected by the production company A serving as the order requester may serve as a printing company. The creator can design a drawing, but has difficulty in printing the drawing onto an object. In such a case, the creator may request the printing on a product to a printing company. In this case, the creator may desire to actually check a sample product, or the creator oneself may be a purchaser in order to distribute, for example, a novelty.

Figure 10:
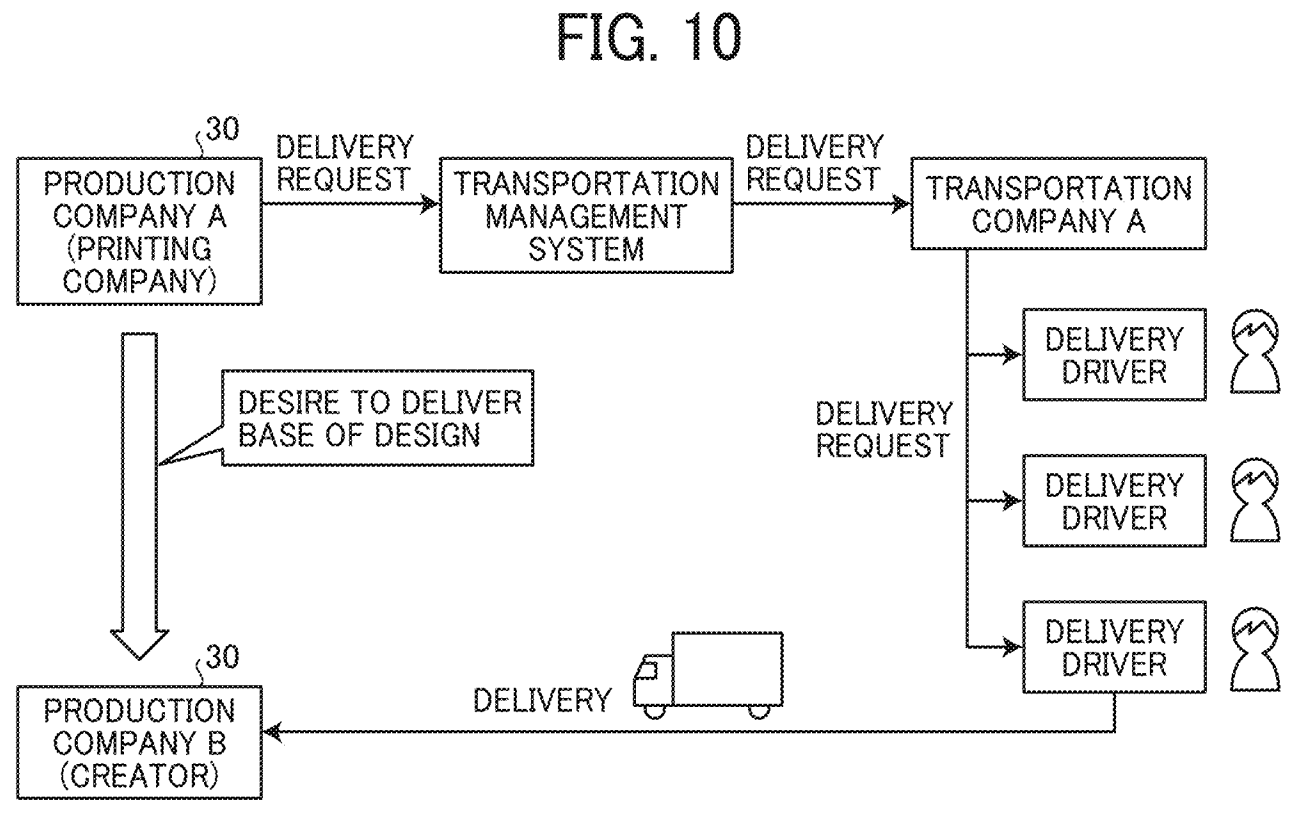

FIG. 10 is a diagram illustrating an example of usage of a product production and sales system according to a modification of the first embodiment of the present disclosure. As illustrated in FIG. 10, the positions of the production company A serving as the order requester and the other production company B selected by the production company A serving as the order requester may be reversed. In the case of the example of the first usage illustrated in FIG. 10, the printing company that is the production company A is good at printing, but is not good at creating a design to be printed. Accordingly, the printing company may request the creator that is the production company B to design. In this case, for example, when the creator mainly creates a design in an analog way (not in a digital way), the base of the design itself needs to be sent to the creator.

Figure 11:
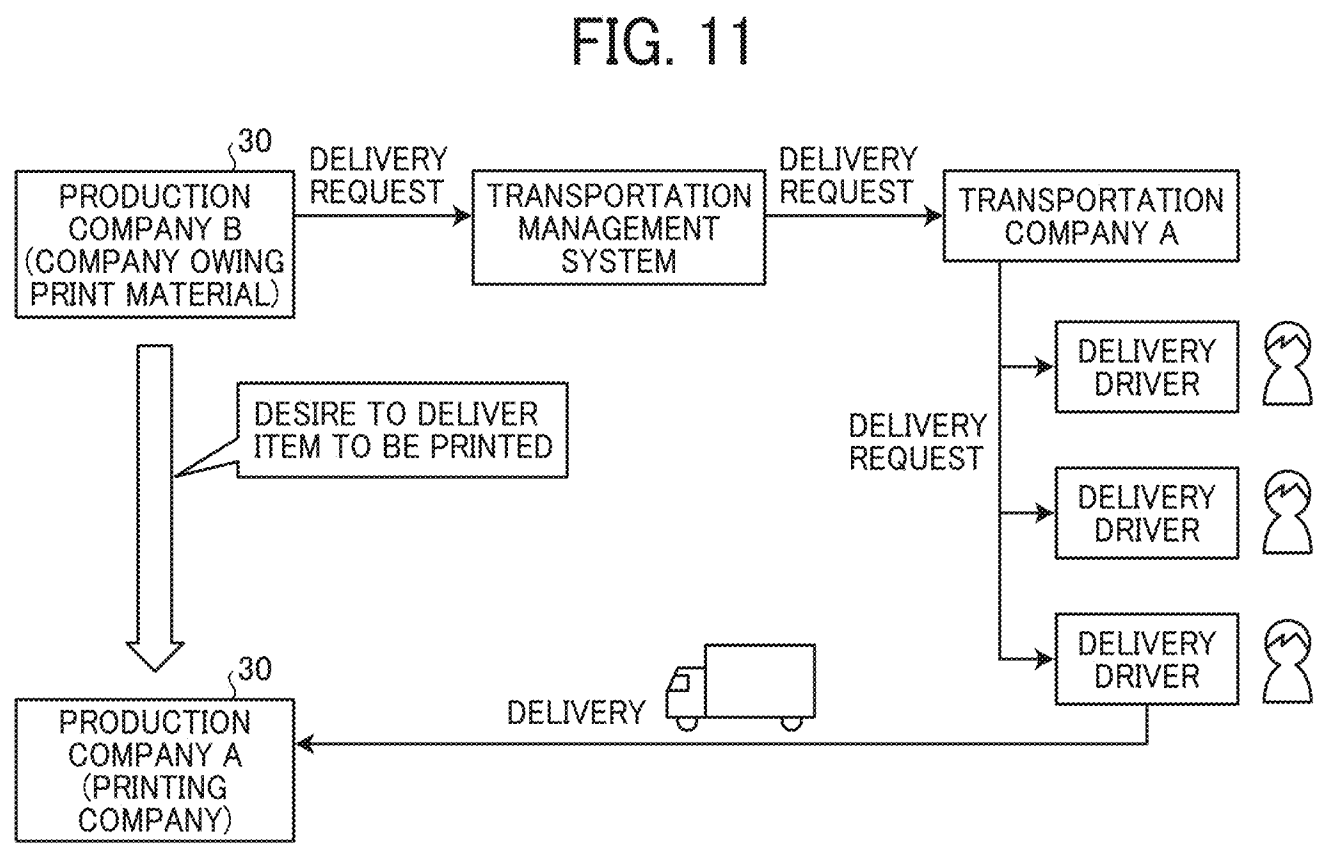

FIG. 11 is a diagram illustrating an example of usage of a product production and sales system according to another modification of the first embodiment of the present disclosure. As illustrated in FIG. 11, the production company A serving as the order requester may be, for example, a printing company, and the production company B selected by the production company A serving as the order requester may be a company owing a print material to be printed. In the case of the example of the second usage illustrated in FIG. 11, when the printing company desires to print a print material that the printing company does not own, the printing company may place an order with a company that owns the print material. In this case, the print material needs to be sent from the company owing the print material to the printing company.

When items are exchanged between the production companies as described above, a system for matching with a more appropriate transportation company may be adopted.

It is assumed that a production company serving as an order requester places an order with another production company. When a medium on which printing is to be executed is sent to the other production company or when the other production company sends a finished product to the order requester, a matching service for matching with a transportation company may be used to shorten and smooth the delivery time. The matching service for matching with a transportation company is a service by which a transportation company and a sender are directly connected with each other. The sender can select a transportation company using, for example, a smartphone or a computer. It is preferable that the sender selects a delivery driver who actually delivers in units of delivery drivers. With such a service system, a request can be made directly to an available delivery driver, and the time and costs involved in the delivery are reduced. In the matching service for matching with a transportation company, it is preferable that a mechanism to evaluate transportation companies and delivery drivers is included in the matching service. By introducing an evaluation system using such a mechanism, transportation companies and delivery drivers will try to deliver more carefully. In addition, the sender can make a request with reference to the evaluations of each transportation company and each delivery driver, and more appropriate matching is achieved. In the matching service for matching with a transportation company, the order requester oneself may select a transportation company as desired when the order requester receives a pre-shipment notice from the other production company, or the other production company may select the most appropriate transportation company. In such a case, the evaluation given to each transportation company may be referred to.

Second Embodiment

Figure 12:
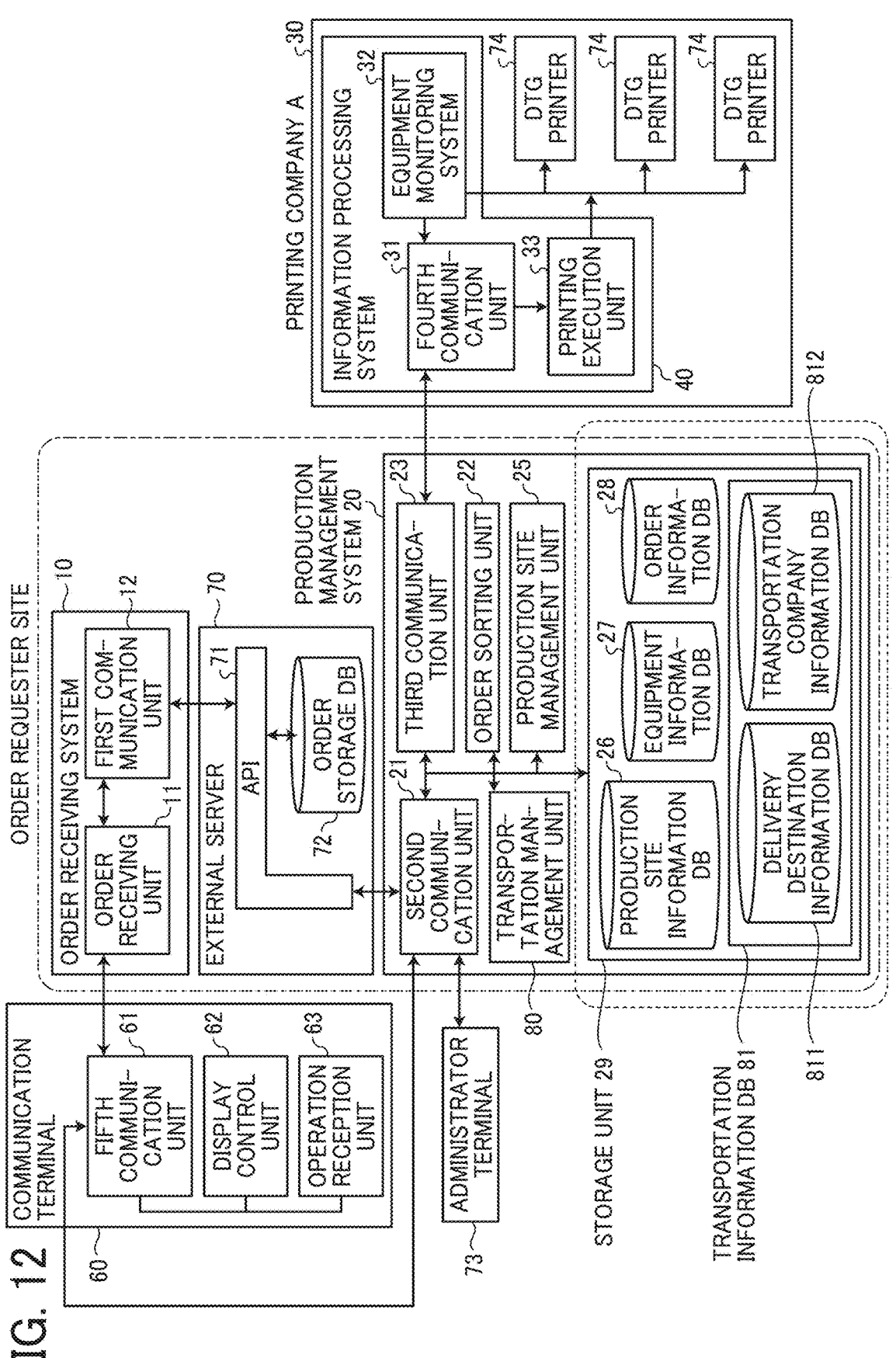
FIG. 12 is a diagram illustrating an overall configuration of a product production and sales system that includes a production management system, according to a second embodiment of the present disclosure.

FIG. 12 is a diagram illustrating an overall configuration of a product production and sales system that includes a production management system, according to a second embodiment of the present disclosure.

The production management system 20 may include a transportation management unit 80 in addition to the second communication unit 21, the order sorting unit 22, the third communication unit 23, the production site management unit 25, and the storage unit 29 of the first embodiment. These functions of the production management system 20 are functions implemented by one of the components illustrated in FIG. 2 operating in accordance with instructions from the CPU 501 according to a program loaded from the HD 504 onto the RAM 503. The production management system 20 includes the storage unit 29 implemented by the RAM 503 and the HD 504 illustrated in FIG. 2. In the storage unit 29, a transportation information DB 81 may be included in addition to the production site information DB 26, the equipment information DB 27, and the order information DB 28 of the first embodiment. In the following description, the features that are not particularly mentioned are substantially the same as those of the first embodiment.

When a production company ships a product to another production company, the production company can select a transportation company as desired from among transportation companies whose information, such as the operating state, the number of people on standby (delivery drivers), and the locations of the people on standby, is displayed in a viewable manner. Not only a transportation company but also a delivery driver may be selected directly. The transportation management unit 80 transmits delivery information requesting collection and delivery to a transportation company (delivery driver) selected by the production company.

The transportation management unit 80 provides a site for selecting a transportation company, and receives selection information on a transportation company selected by a delivery requester using the web browser operating on the communication terminal 60 operated by the delivery requester and delivery destination information.

The site for selecting a transportation company receives the selection information on a transportation company and the delivery destination information through a web application implemented by cooperation between a program executed by the web server and a program executed by the web browser. The order sorting unit 22 generates screen information of a screen displayed by the web browser. The screen information is a program described in formats such as the HTML, the XML, the script language, and the CSS. Typically, the structure of a web page is determined by the HTML, the operation of the web page is defined by the script language, and the style of the web page is determined by the CSS.

On the communication terminal 60, a native application for selecting a transportation company may operate, instead of the web application. In this case, the native application has the structure of the screen, and the contents to be displayed are transmitted in a format such as the XML from the production management system 20 to the communication terminal 60 of each production company.

The third communication unit 23 transmits the order information and the selection information on a transportation company to the information processing system 40 arranged in one of the production site systems 30 selected by the order sorting unit 22.

In a delivery destination information DB 811, for example, information on the location of the other production company selected by the production company serving as the order requester and information on the location of the production company serving as the order requester are stored.

In a transportation company information DB 812, various kinds of usable information on a transportation company is stored. Examples of the information on a transportation company include the charge system of the transportation company, the area where the transportation company mainly does business, and the specialty of the transportation company (e.g., same-day delivery, careful delivery, cool delivery service). The information on a transportation company may include pieces of information other than the above-described pieces of information.

Third Embodiment

Transportation Management System

Figure 13:
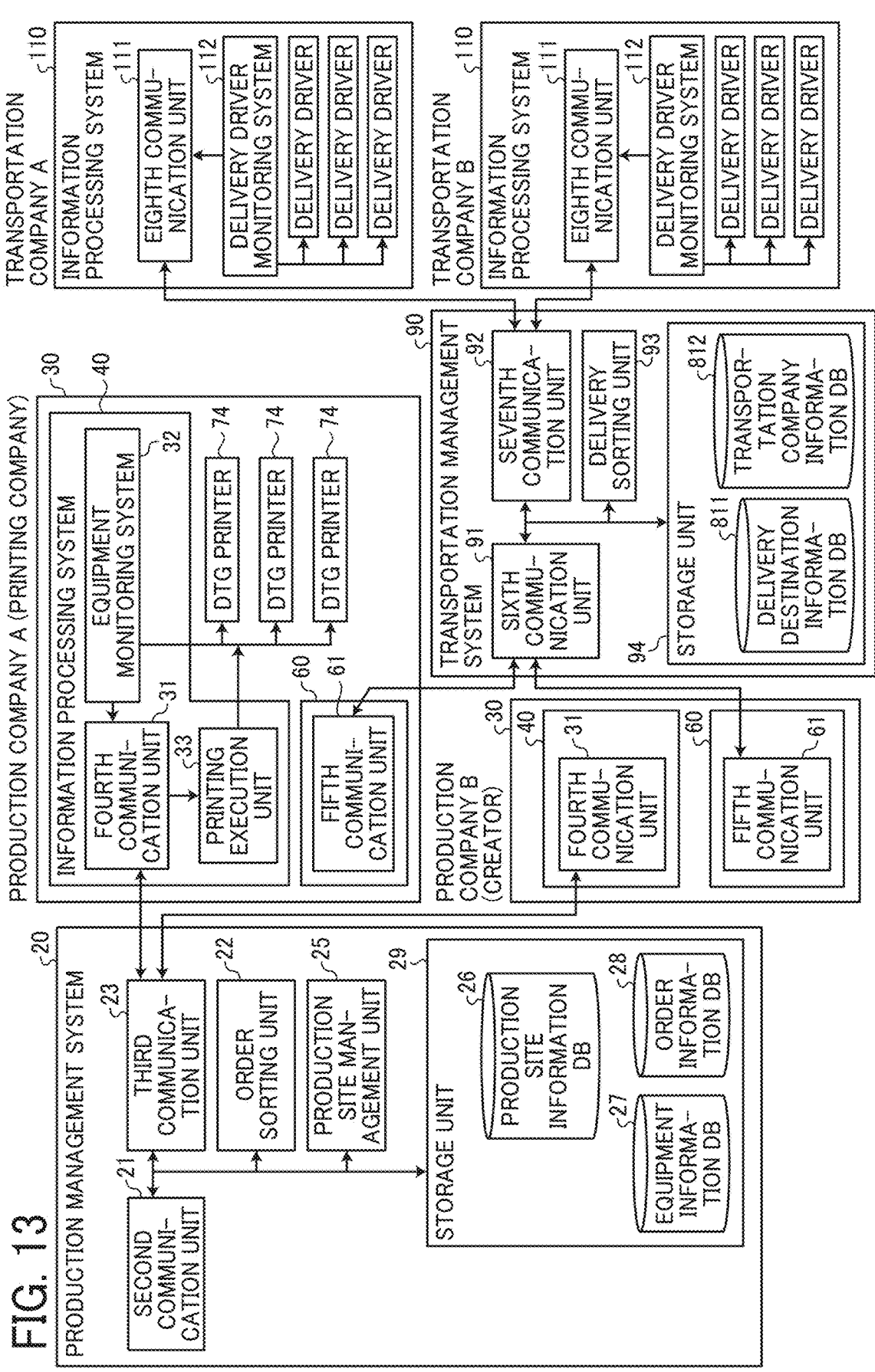
FIG. 13 is a diagram illustrating a configuration of a portion of a product production and sales system according to a third embodiment of the present disclosure.

FIG. 13 is a diagram illustrating a configuration of a portion of a product production and sales system according to a third embodiment of the present disclosure. As in the second embodiment described above, the production management system 20 may include the transportation management unit 80 for managing transportation, and the storage unit 29 may include the delivery destination information DB 811 and the transportation company information DB 812. Alternatively, as illustrated in FIG. 13, a transportation management system 90 and information processing systems 110 may be provided separately from the production management system 20. In the following description, any one of the information processing systems 110 is referred to as an information processing system 110.

The transportation management system 90 is one or more information processing apparatuses that manage selection information on a transportation company and delivery destination information.

The information processing system 110 is one or more information processing apparatuses installed in, for example, a transportation company. The information processing system 110 provides information on a delivery driver managed by the information processing system 110 to the transportation management system 90. For example, the information processing system 110 obtains the operating state of a delivery driver with a delivery driver monitoring system 112 and provides the transportation management system 90 with the operating state of the delivery driver.

Each of the transportation management system 90 and the information processing system 110 may be, for example, a desktop PC, a laptop PC, a smartphone, or a tablet terminal, which operates on a general-purpose OS such as WINDOWS, MAC OS, ANDROID, or IOS.

Each of the transportation management system 90 and the information processing system 110 has a configuration as a computer 500, similarly to the order receiving system 10 illustrated in FIG. 2.

The transportation management system 90 may include a sixth communication unit 91, a seventh communication unit 92, a delivery sorting unit 93, and a storage unit 94. These functions of the transportation management system 90 are functions implemented by one of the components illustrated in FIG. 2 operating in accordance with instructions from the CPU 501 according to a program (a web browser or a native application) loaded from the HD 504 onto the RAM 503.

The information processing system 110 may include an eighth communication unit 111 and the delivery driver monitoring system 112. These functions of the information processing system 110 are functions implemented by one of the components illustrated in FIG. 2 operating in accordance with instructions from the CPU 501 according to a program (a web browser or a native application) loaded from the HD 504 onto the RAM 503.

When a production company ships a product to another production company, the production company can select a transportation company as desired from among transportation companies whose information, such as the operating state, the number of people on standby (delivery drivers), and the locations of the people on standby, is displayed in a viewable manner. Not only a transportation company but also a delivery driver may be selected directly. The fifth communication unit 61 of the communication terminal 60 transmits delivery information requesting collection and delivery to a transportation company (delivery driver) selected by the production company.

The transportation management system 90 provides a site for selecting a transportation company, and receives selection information on a transportation company selected by a delivery requester using the web browser operating on the communication terminal 60 operated by the delivery requester and delivery destination information with the sixth communication unit 91.

The site for selecting a transportation company receives the selection information on a transportation company and the delivery destination information through a web application implemented by cooperation between a program executed by the web server and a program executed by the web browser. The delivery sorting unit 93 generates screen information of a screen displayed by the web browser. The screen information is a program described in formats such as the HTML, the XML, the script language, and the CSS. Typically, the structure of a web page is determined by the HTML, the operation of the web page is defined by the script language, and the style of the web page is determined by the CSS.

On the communication terminal 60, a native application for selecting a transportation company may operate, instead of the web application. In this case, the native application has the structure of the screen, and the contents to be displayed are transmitted in a format such as the XML from the transportation management system 90 to the communication terminal 60 of each production company.

The seventh communication unit 92 transmits the selection information on a transportation company and the delivery destination information to the information processing system 110 owned by one of the transportation companies selected by the delivery sorting unit 93.

In the delivery destination information DB 811, for example, information on the location of the other production company selected by the production company serving as the order requester and information on the location of the production company serving as the order requester are stored. In the transportation company information DB 812, various usable information on a transportation company is stored. Examples of the information on a transportation company include the charge system of the transportation company, the area where the transportation company mainly does business, and the specialty of the transportation company (e.g., same-day delivery, careful delivery, cool delivery service). The information on a transportation company may include pieces of information other than the above-described pieces of information.

The eighth communication unit 111 of the information processing system 110 owned by the transportation company selected from the transportation companies receives the selection information on a transportation company and the delivery destination information from the seventh communication unit 92 of the transportation management system 90. A monitoring result of delivery drivers (the operation and standby states of the delivery drivers, the operation areas) held by the transportation company is transmitted to the eighth communication unit 111 and then transmitted to the transportation management system 90.

Accordingly, the state of each delivery driver of each transportation company can be grasped on the transportation management system 90.

While some embodiments of the present disclosure have been described, the present disclosure is not limited to such embodiments and may be modified and substituted in various ways without departing from the spirit of the present disclosure.

For example, although the production of apparel products has been described in the present embodiments, the present embodiments are applicable to any products that are produced by printing images on materials of the products on demand.

The functional configuration illustrated in, for example, FIG. 4 is divided according to functions in order to facilitate understanding of the processing units executed by the order receiving system 10, the production management system 20, and the production site system 30. No limitation to the scope of the present disclosure is intended by how the processing units are divided or by the names of the processing units. The processing units executed by the order receiving system 10, the production management system 20, and the production site system 30 may be divided into a greater number of processing units in accordance with the contents of the processing units. In addition, a single processing unit can be divided to include a greater number of processing units.

The group of apparatuses or devices described in the above-described embodiments of the present disclosure are merely one example of a plurality of computing environments that implement embodiments of the present disclosure. In some embodiments, the production management system 20 includes multiple computing devices such as a server cluster. The multiple computing devices communicate with one another through any type of communication link including, for example, a network or a shared memory, and perform the operations disclosed herein.

Each of the functions of the embodiments described above may be implemented by one or more processing circuits or circuitry. The functionality of the elements disclosed herein may be implemented using circuitry or processing circuitry which includes general-purpose processors, special-purpose processors, integrated circuits, application-specific integrated circuits (ASICs), digital signal processors (DSPs), field-programmable gate arrays (FPGAs), circuitry and/or combinations thereof which are configured or programmed to perform the disclosed functionality. The hardware may be any hardware disclosed herein or otherwise known which is programmed or configured to carry out the recited functionality.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. A production management system comprising circuitry configured to:

store in a memory profile information on a plurality of production companies, each production company owning at least one production site having production equipment connected to a network;

display the profile information of the plurality of production companies to be viewed by a user of the production equipment; and receive selection of one of the plurality of production companies with which an order of a product to be produced is placed, wherein the memory further stores operating state information of production equipment, wherein the selection is performed by the user based on the operating state information and production capacity, and wherein the production management system further comprises:

communication circuitry to continuously or periodically obtain the operating state information from dedicated equipment monitoring systems located at the production sites via a network connection, and another communication circuitry to transmit the operating state information received by the communication circuitry for the selection by the user.

2. The production management system according to claim 1, wherein:

the circuitry is configured to receive registration of the profile information from an information processing terminal connected to the network.

3. The production management system according to claim 1, wherein:

the profile information includes, for each of the plurality of production companies, information on products that can be produced by the production equipment, and the memory stores information on media type, supported printing method, and operation history of the production equipment.

4. A non-transitory recording medium carrying computer readable codes for controlling a computer system to perform a method, the method comprising:

storing in a memory profile information on a plurality of production companies, each production company owning at least one production site having production equipment connected to a network;

displaying the profile information of the plurality of production companies to be viewed by a user of the production equipment; and receiving selection of one of the plurality of production companies with which an order of a product to be produced is place, wherein the storing further stores operating state information of production equipment, wherein the selection is performed by the user based on the operating state information and production capacity, and wherein the production management method further comprises:

continuously or periodically obtaining the operating state information from dedicated equipment monitoring systems located at the production sites via a network connection, and transmitting the operating state information which has been received for the selection by the user.

5. A production management method comprising:

storing in a memory profile information on a plurality of production companies, each production company owning at least one production site having production equipment connected to a network;

displaying the profile information of the plurality of production companies to be viewed by a user of the production equipment; and receiving selection of one of the plurality of production companies with which an order of a product to be produced is placed, wherein the storing further stores operating state information of production equipment, wherein the selection is performed by the user based on the operating state information and production capacity, and wherein the production management method further comprises:

continuously or periodically obtaining the operating state information from dedicated equipment monitoring systems located at the production sites via a network connection, and transmitting the operating state information which has been received for the selection by the user.

6. The production management system according to claim 1, wherein:

the circuitry is further configured to transmit an order for the product to the production equipment of the selected one of the plurality of production companies to cause the production equipment to physically produce the product.

7. The production management system according to claim 1, wherein:

the circuitry is configured to automatically generate a list of candidate production companies from the plurality of production companies based on contents of the order.

8. The production management system according to claim 1, wherein:

the profile information for at least one of the plurality of production companies includes an introduction video.

9. The production management system according to claim 1, wherein:

the circuitry is configured to provide a user interface that enables the user to establish direct contact with the selected one of the plurality of production companies via at least one of a phone call, a text chat, or a video call.

10. The production management system according to claim 1, wherein:

the circuitry is configured to display the operating state information as a graph.

11. The production management system according to claim 1, wherein:

the operating state information includes at least one of a print production ratio, an equipment operating frequency, an elapsed time since a last maintenance, or a maintenance history.

12. The production management system according to claim 1, wherein:

the operating state information is obtained from an equipment monitoring system that monitors the production equipment.

13. The non-transitory recording medium according to claim 4, wherein:

the method further comprises receiving registration of the profile information from an information processing terminal connected to the network.

14. The non-transitory recording medium according to claim 4, wherein:

the profile information includes, for each of the plurality of production companies, information on products that can be produced by the production equipment.

15. The non-transitory recording medium according to claim 4, wherein:

the method further comprises transmitting an order for the product to the production equipment of the selected one of the plurality of production companies to cause the production equipment to physically produce the product.

16. The non-transitory recording medium according to claim 4, wherein:

the storing further comprises storing an operation history of the production equipment.

17. The production management method according to claim 5, further comprising:

receiving registration of the profile information from an information processing terminal connected to the network.

18. The production management method according to claim 5, wherein:

the profile information includes, for each of the plurality of production companies, information on products that can be produced by the production equipment.

19. The production management method according to claim 5, further comprising:

transmitting an order for the product to the production equipment of the selected one of the plurality of production companies to cause the production equipment to physically produce the product.

20. The production management method according to claim 5, wherein the storing further comprises:

storing an operation history of the production equipment.

* * * * *